(12) United States Patent
Nagashima

(10) Patent No.: US 8,261,260 B2
(45) Date of Patent: Sep. 4, 2012

(54) DRIVER MANAGEMENT APPARATUS AND METHOD THEREFOR

(75) Inventor: Takeyuki Nagashima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 964 days.

(21) Appl. No.: 12/271,502

(22) Filed: Nov. 14, 2008

(65) Prior Publication Data

US 2009/0133015 A1     May 21, 2009

(30) Foreign Application Priority Data

Nov. 16, 2007    (JP) ................................ 2007-298273

(51) Int. Cl.
*G06F 9/445*     (2006.01)
(52) U.S. Cl. ..................................................... 717/176
(58) Field of Classification Search ........... 717/174–177
See application file for complete search history.

(56) References Cited

U.S. PATENT DOCUMENTS

| | | | |
|---|---|---|---|
| 6,466,971 B1 * | 10/2002 | Humpleman et al. | 709/220 |
| 6,546,419 B1 * | 4/2003 | Humpleman et al. | 709/223 |
| 7,975,054 B2 * | 7/2011 | Hirata et al. | 709/227 |
| 2004/0003112 A1 | 1/2004 | Alles | |
| 2007/0032888 A1 * | 2/2007 | Hirata et al. | 700/19 |
| 2007/0115996 A1 * | 5/2007 | Shitano et al. | 370/392 |

FOREIGN PATENT DOCUMENTS

| | | |
|---|---|---|
| JP | 2004-38956 | 2/2004 |
| JP | 2007-66091 | 3/2007 |
| WO | 2007026908 A1 | 3/2007 |

* cited by examiner

*Primary Examiner* — Anna Deng
(74) *Attorney, Agent, or Firm* — Canon USA Inc IP Division

(57) ABSTRACT

A driver management apparatus includes a receiving unit configured to receive a network entry message sent by unicast according to a search protocol for one-to-one connection from one of a plurality of devices connected to a network, a determination unit configured to determine a capacity to install a driver according to the search protocol for one-to-one connection of a device connected to the network, and a processing unit configured to perform processing for installing, on a client terminal apparatus connected to the network, a driver for operating a device that has sent the network entry message. The processing unit is configured to perform different processing operations for installing the driver for operating the device with respect to respective devices having different capacities according to the capacity determined by the determination unit.

11 Claims, 18 Drawing Sheets

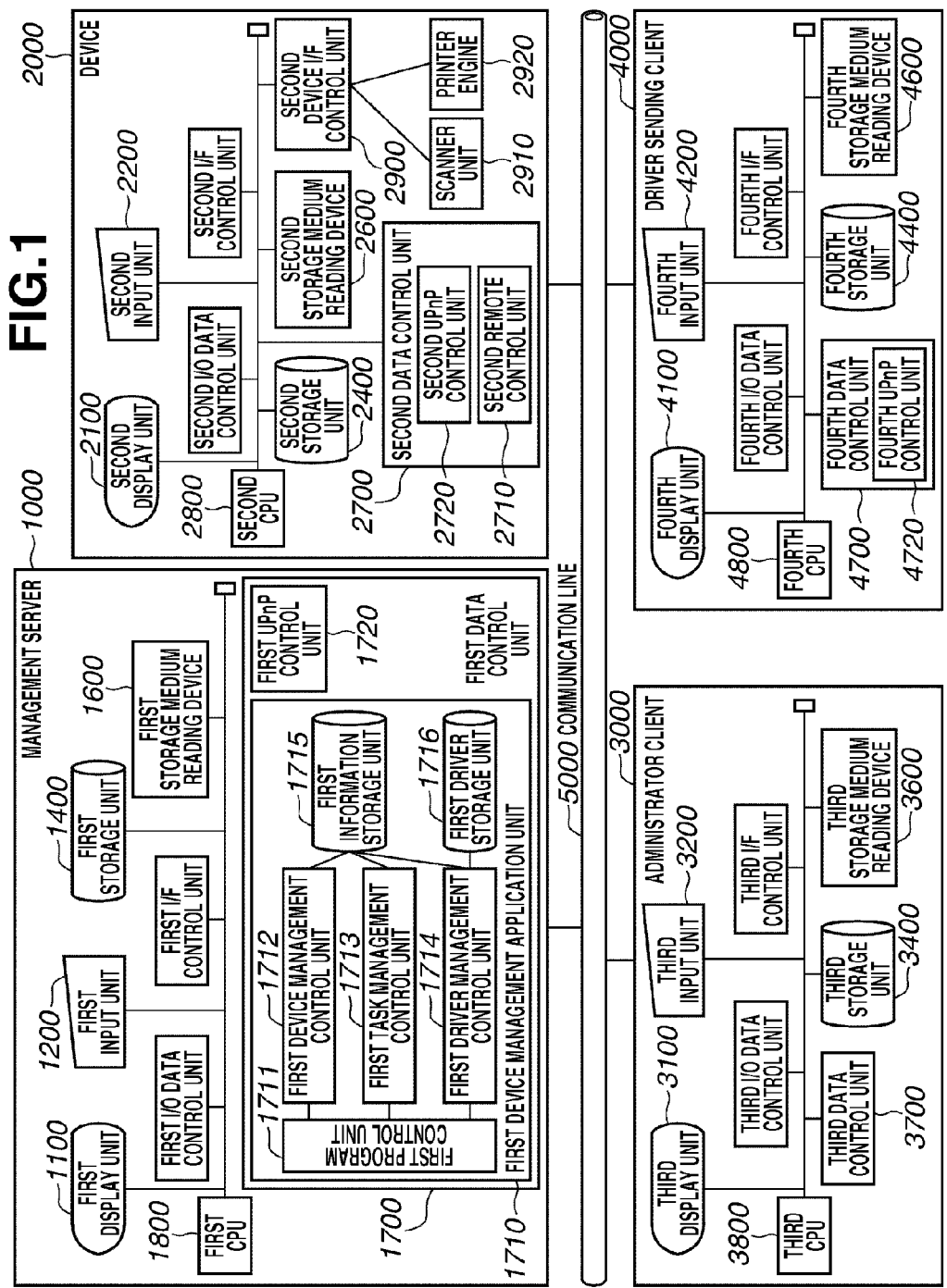

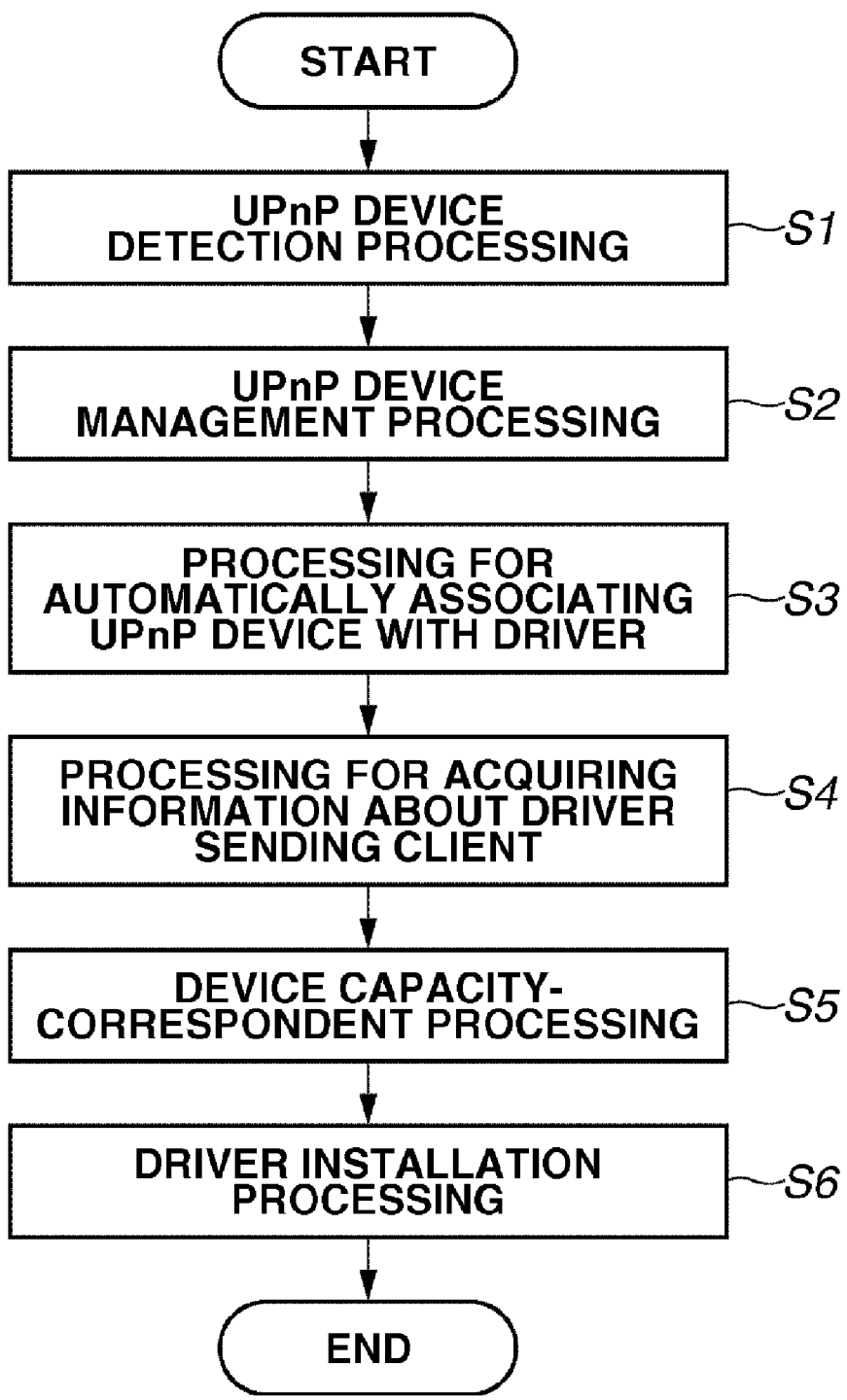

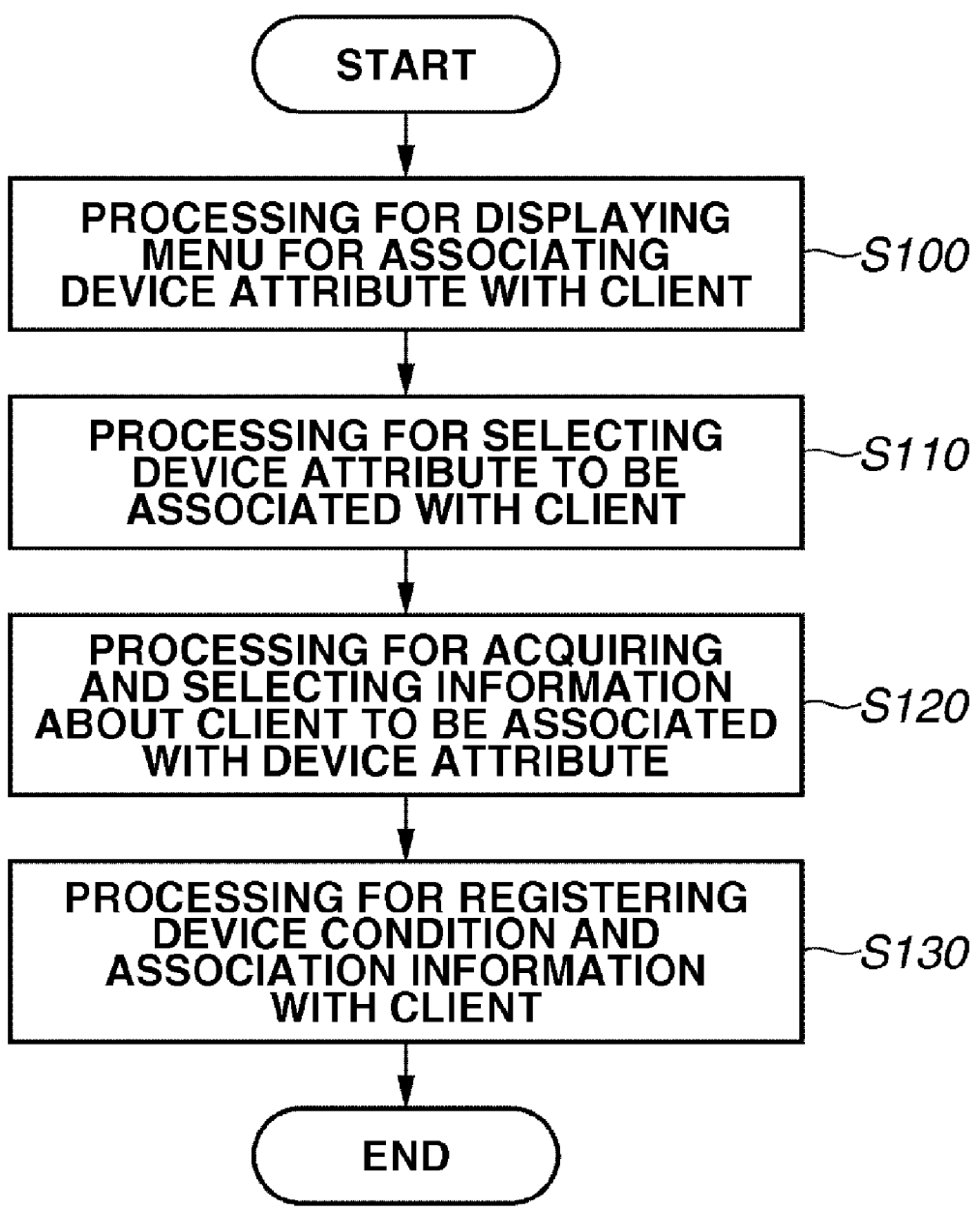

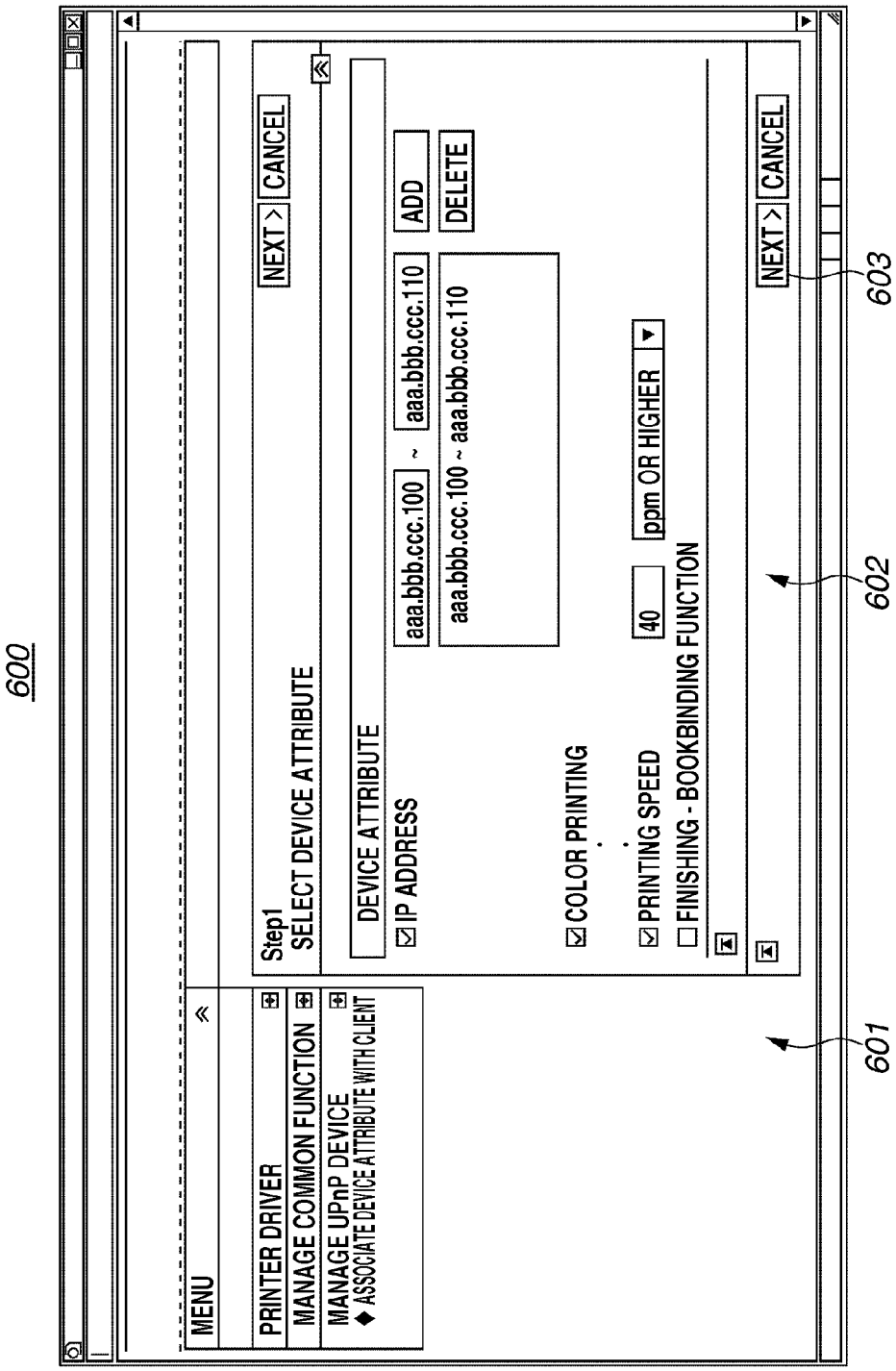

| CLIENT ID | OS NAME | ... | IP ADDRESS | RELATIONSHIP BETWEEN GROUPS |
|---|---|---|---|---|
| CLIENT00 | A/B/C | ... | aaa.bbb.ccc.100 | GROUP 1 > SUBGROUP 1 |
| CLIENT01 | A/B/C | ... | aaa.bbb.ccc.002 | GROUP 1 > SUBGROUP 2 |
| CLIENT02 | A/B/C | ... | aaa.bbb.ccc.101 | GROUP 1 > SUBGROUP 1 |
| CLIENT03 | A/B/C | ... | aaa.bbb.ccc.004 | GROUP 1 > SUBGROUP 2 |
| ... | ... | ... | ... | ... |

| DEVICE ATTRIBUTE ID | IP ADDRESS ID | COLOR PRINTING | ... | PRINTING SPEED ID | FINISHING ID |
|---|---|---|---|---|---|
| SelectedDevAttr-1 | IPID-1 | ON | ... | PVID-1 | OFF |
| SelectedDevAttr-2 | OFF | ON | ... | OFF | FinID-1 |
| ... | ... | ... | ... | ... | ... |

| IP ADDRESS ID | IP ADDRESS ATTRIBUTE |
|---|---|
| IPID-1 | aaa.bbb.ccc.100 ~ aaa.bbb.ccc.110 |
| ⋮ | ⋮ |

| PRINTING SPPED ID | PRINTING SPPED ATTRIBUTE | CONDITION ATTRIBUTE |
|---|---|---|
| PVID-1 | 40 | ppm OR HIGHER |
| ⋮ | ⋮ | ⋮ |

| FINISHING ID | FINISHING ATTRIBUTE |
|---|---|
| FinID-1 | BOOKBINDING FUNCTION |
| ⋮ | ⋮ |

| SELECTED CLIENT ID | SELECTED CLIENT |
|---|---|
| SelectedClients-1 | CLIENT00, CLIENT02 |
| SelectedClients-2 | CLIENT00, CLIENT03 |
| ⋮ | ⋮ |

| DEVIDE ATTRIBUTE ID | SELECTED CLIENT ID |
|---|---|
| SelectedDevAttr-1 | SelectedClients-1 |
| SelectedDevAttr-2 | SelectedClients-2 |
| ⋮ | ⋮ |

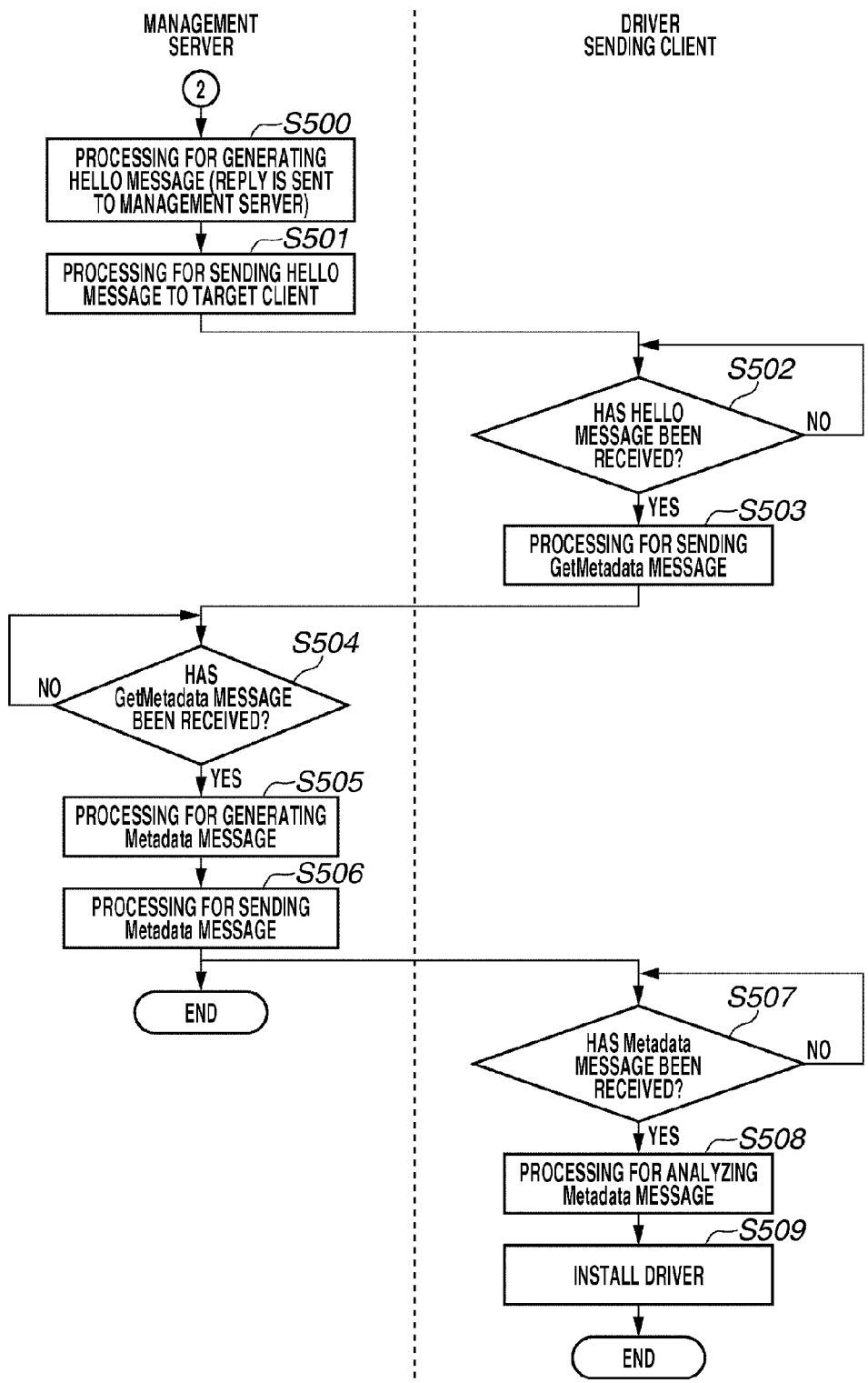

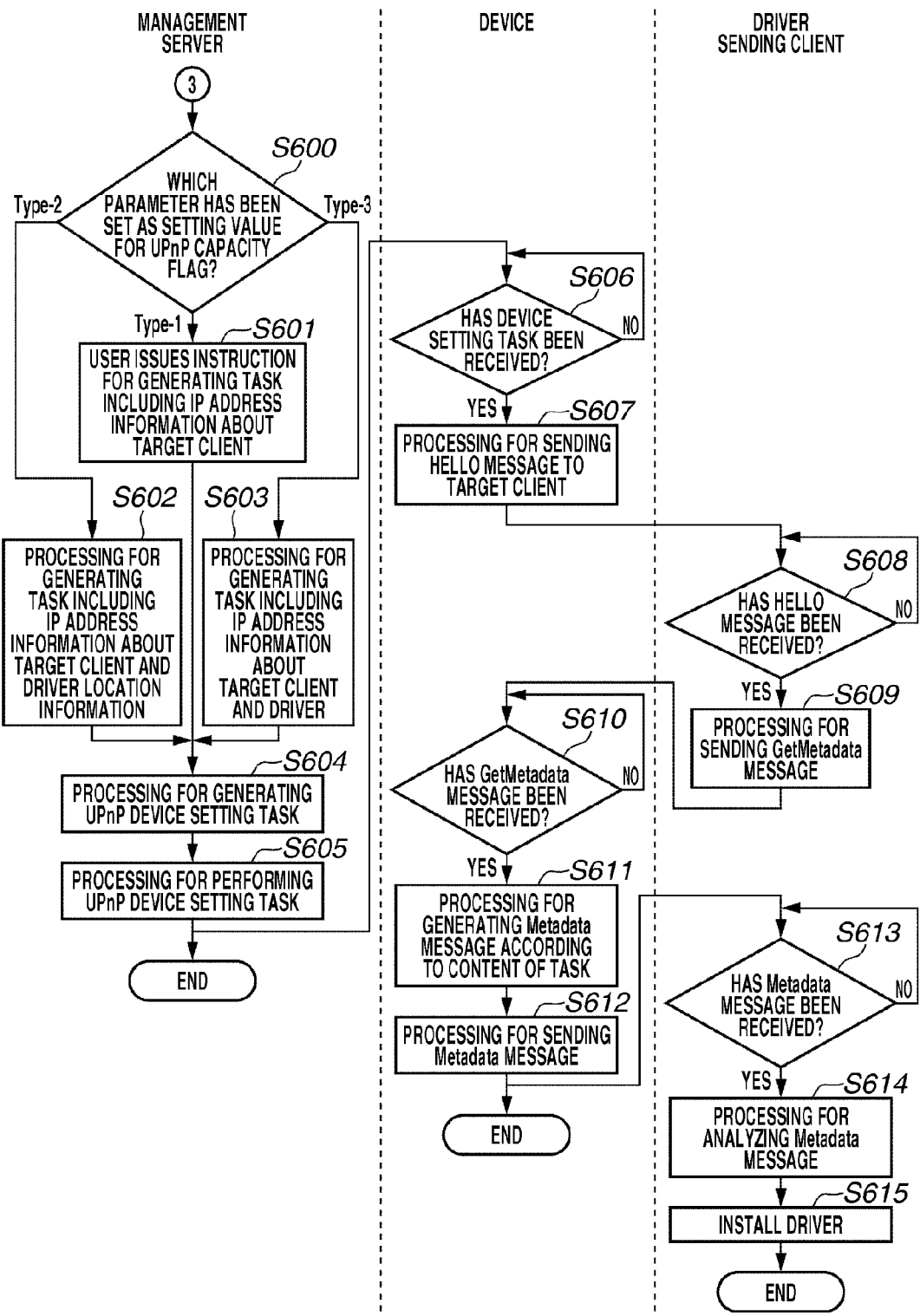

| DEVICE NUMBER | MAC ADDRESS | UPnPID | ... | IP ADDRESS | COLOR PRINTING | PRINTING SPEED | FINISHING FUNCTION |
|---|---|---|---|---|---|---|---|
| Dev-1 | AA-BB-CC-DD-EE-01 | UPnP_4E0F | ... | aaa.bbb.ccc.101 | COLOR | 40 | NONE |
| ... | ... | ... | ... | ... | ... | ... | ... |

FIG.18
240

| DRIVER ID | UPnPID |
|---|---|
| DRIVER00 | UPnP_4E0F |
| DRIVER01 | UPnP_5FFF |
| ⋮ | ⋮ |

FIG.19
250

| ASSOCIATION ID | DEVICE NUMBER | DRIVER ID |
|---|---|---|
| Connect-01 | Dev-1 | DRIVER00 |
| ⋮ | ⋮ | ⋮ |

FIG.20
260

| DEVICE NUMBER | DEVICE UPnP CAPACITY FLAG |
|---|---|
| Dev-1 | Type-3 |
| ⋮ | ⋮ |

DRIVER MANAGEMENT APPARATUS AND METHOD THEREFOR

BACKGROUND OF THE INVENTION

1. Field of the Invention

The present invention relates to a driver management apparatus, a driver management method, and a storage medium. More specifically, the present invention relates to a method for managing a device driver.

2. Description of the Related Art

In a conventional method, in a device-client environment in which a device, such as a printer, and a client terminal apparatus (hereinafter simply referred to as a "client" where necessary) are in communication with each other via a network, a driver compliant with the device is installed on the client.

More specifically, in the conventional method, when the device connected to the network sends a network entry message to the network, the client on the network installs a driver for the device in response to the network entry message.

Furthermore, the client installs the driver according to a reply from the device to a network entry message sent to the network upon connecting to the network. The conventional method like this is implemented, for example, by Universal Plug and Play (UPnP™) protocol of Microsoft® Corporation, Web Services for Devices (WSD), or the Rendezvous function of Apple® Inc. (see Japanese Patent Application Laid-Open No. 2004-38956).

Furthermore, Japanese Patent Application Laid-Open No. 2007-66091 discusses a method for preventing installation of a driver unnecessary to a user on a client. In the conventional method discussed in Japanese Patent Application Laid-Open No. 2007-66091, a client includes a module for controlling a setting related to whether to accept UPnP. Furthermore, the client determines whether to install the driver for the device connected to the network according to the setting.

However, in the above-described conventional method, the device and the client in communication with each other using a one-to-one search protocol bypass a server and directly send and receive information between them about whether a driver can be installed. Accordingly, in this case, the server cannot centrally manage processing for installing the driver on the client.

In this regard, the above-described problem may be solved by introducing a server. However, if a server is merely provided, a network entry message is sent to both the client and the server. In this case, the server cannot manage the network entry message sent to the client. Thus, the above-described problem cannot be solved with this conventional method.

Meanwhile, the above-described server and the device each have various functions. More specifically, the server can include a pseudo UPnP function and the device can include a remote setting function for the UPnP function.

However, it is very difficult or impossible to install a driver while responding flexibly to such functions.

SUMMARY OF THE INVENTION

The present invention is directed to a method for appropriately managing a device driver to be installed on a client terminal apparatus connected to a network.

According to an aspect of the present invention, a driver management apparatus includes a receiving unit configured to receive a network entry message sent by unicast according to a search protocol for one-to-one connection from one of a plurality of devices connected to a network, a determination unit configured to determine a capacity to install a driver according to the search protocol for one-to-one connection of a device connected to the network, and a processing unit configured to perform processing for installing, on a client terminal apparatus connected to the network, a driver for operating the device that has sent the network entry message. The processing unit is configured to perform different processing operations for installing the driver for operating the device with respect to respective devices having different capacities according to the capacity determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the present invention.

FIG. 1 illustrates an example of a configuration of a printing system according to an exemplary embodiment of the present invention.

FIG. 4 is a flow chart that illustrates an example of a basic operation performed in the printing system according to an exemplary embodiment of the present invention.

FIG. 5 is a flow chart that illustrates an example of an operation performed by the management server in associating a device attribute with a driver sending client according to an exemplary embodiment of the present invention.

FIG. 6 illustrates an example of a user interface (UI) screen displayed when a user selects an "associate device attribute with client" item according to an exemplary embodiment of the present invention.

FIG. 8 illustrates an example of a table for driver sending clients previously stored in a first information storage unit according to an exemplary embodiment of the present invention.

FIG. 10 illustrates an example of a first table for storing the content of a setting performed by the user via the UI screen illustrated in FIG. 6 according to an exemplary embodiment of the present invention.

FIG. 11 illustrates an example of a second table for storing the content of a setting performed by the user via the UI screen illustrated in FIG. 6 according to an exemplary embodiment of the present invention.

FIG. 12 illustrates an example of a third table for storing the content of a setting performed by the user via the UI screen illustrated in FIG. 6 according to an exemplary embodiment of the present invention.

FIG. 13 illustrates an example of a fourth table for storing the content of a setting performed by the user via the UI screen illustrated in FIG. 6 according to an exemplary embodiment of the present invention.

FIG. 14 illustrates an example of a table for storing the content of a setting performed by the user via the UI screen illustrated in FIG. 7 according to an exemplary embodiment of the present invention.

FIG. 15 illustrates an example of a table for storing a device attribute and a driver sending client associated with each other according to an exemplary embodiment of the present invention.

FIG. 16C is a flow chart that illustrates processing performed subsequent to the processing in FIG. 16B according to an exemplary embodiment of the present invention.

FIG. 16D is a flow chart that illustrates processing performed subsequent to the processing in FIG. 16B according to an exemplary embodiment of the present invention.

FIG. 17 illustrates an example of a table for storing device attribute information in the first information storage unit according to an exemplary embodiment of the present invention.

FIG. 18 illustrates an example of a table for storing driver information in a first driver storage unit according to an exemplary embodiment of the present invention.

FIG. 19 illustrates an example of a table for storing a device and a driver associated with each other in the first information storage unit according to an exemplary embodiment of the present invention.

FIG. 20 illustrates an example of a table for storing a device UPnP capacity flag in the first information storage unit according to an exemplary embodiment of the present invention.

DETAILED DESCRIPTION OF THE EMBODIMENTS

Figure 2A:
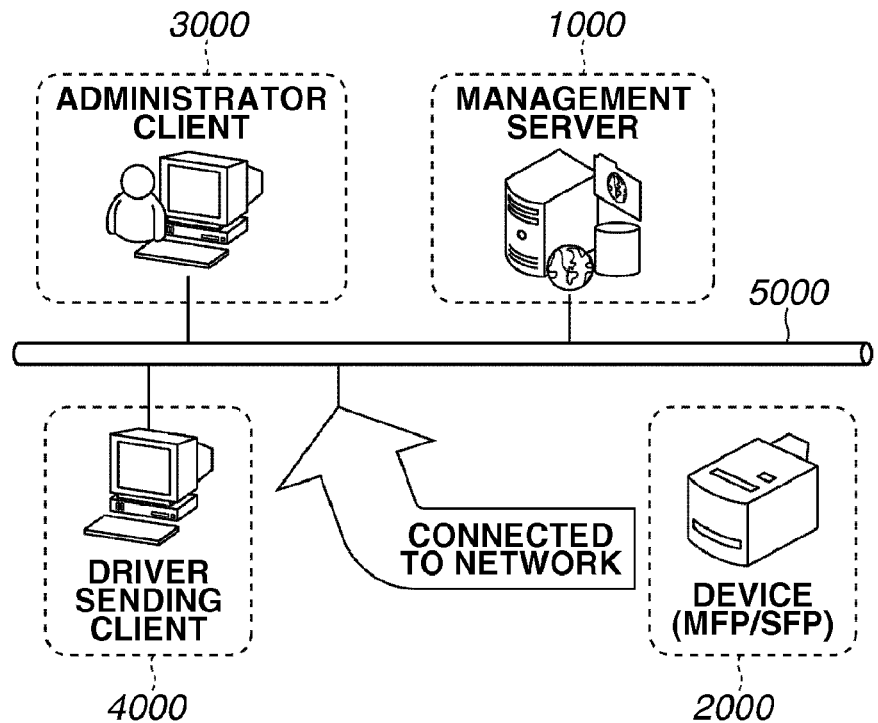
FIGS. 2A and 2B each illustrates an example of an operation of the printing system in the case where a management server includes a pseudo UPnP function corresponding to a UPnP function of a device according to an exemplary embodiment of the present invention.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

An exemplary embodiment of the present invention will now be described below. FIG. 1 illustrates an example of a configuration of a printing system according to the present exemplary embodiment.

Referring to FIG. 1, the printing system includes a management server 1000, a device 2000, an administrator client 3000, and a driver sending client 4000. The management server 1000, the device 2000, the administrator client 3000, and the driver sending client 4000 are in communication with one another via a communication line 5000.

Furthermore, the management server 1000, the device 2000, the administrator client 3000, and the driver sending client 4000 include CPUs 1800, 2800, 3800, and 4800, respectively. The CPUs 1800, 2800, 3800, and 4800 each execute a program using related data, for example.

The program and the related data are stored on a storage medium such as a floppy disk (FD), a compact disk-read only memory (CD-ROM), or an integrated circuit (IC) memory card. The program and the related data are read by storage medium reading devices 1600, 2600, 3600, and 4600 of the management server 1000, the device 2000, the administrator client 3000, and the driver sending client 4000.

Furthermore, the CPUs 1800, 2800, 3800, and 4800 each loads a system program and an application program from the storage medium reading devices 1600, 2600, 3600, and 4600 to data control units 1700, 2700, 3700, and 4700.

The system program and the application program are used for performing processing on information entered via display units 1100, 2100, 3100, and 4100 or input units 1200, 2200, 3200, and 4200. The system program and the application program are used for inputting and outputting data via interface (I/F) control units 1400, 2400, 3400, and 4400.

The display units 1100, 2100, 3100, and 4100 each includes a display device, such as a cathode ray tube (CRT) display or a liquid crystal display (LCD). Furthermore, the input units 1200, 2200, 3200, and 4200 each is constituted by a pointing device, such as a mouse, and an input device, such as a keyboard.

Furthermore, each of the storage units 1600, 2600, 3600, and 4600 can include a hard disk or a magneto-optical disk. Here, it is also useful if each of the storage units 1600, 2600, 3600, and 4600 includes a combination of a hard disk and a magneto-optical disk.

The device 2000 includes a scanner unit 2910 and a printer engine 2920, which is a printing unit. That is, the device 2000 is, for example, a multifunction printing apparatus. For example, the device 2000 performs a print job sent from the driver sending client 4000 with the printer engine 2920.

Note that the print job can be either directly input from the driver sending client 4000 or indirectly input from the driver sending client 4000 via the management server 1000.

In addition, the device 2000 stores device information, such as Management Information Base (MIB). The acquisition and setting of the device information can be mainly implemented by a user operation on the administrator client 3000 via the communication line 5000.

The management server 1000 includes a UPnP control unit 1720, while the device 2000 includes a UPnP control unit 2720. The UPnP control units 1720 and 2720 each include a function for controlling the UPnP function. The UPnP control unit 1720 and the UPnP control unit 2720 are associated with an operating system (OS).

In the present exemplary embodiment, the UPnP control unit 2720 of the device 2000 issues (sends) a network entry message to the management server 1000 when the device 2000 is connected to the communication line 5000.

At this time, the second UPnP control unit 2720 sends the network entry message to the management server 1000 by unicast, instead of using multicast, according to the UPnP protocol. Here, the UPnP protocol is an example of a search protocol for one-to-one connection in the present exemplary embodiment. The network entry message is detected by the first UPnP control unit 1720 of the management server 1000. Here, the search protocol for one-to-one connection is a protocol such as UPnP.

In UPnP, the communication is performed in the following manner. At first, when a new device has entered a network, the new device broadcasts a Hello message onto the network.

After receiving the Hello message, network devices existing on the network recognize that the new network device has entered the network.

On the other hand, when the new network device exits from the network, the new network device broadcasts a bye message onto the network. After receiving the bye message from the new network device, the network devices existing on the network recognize that the new network device has exited from the network.

The one-to-one search protocol is a protocol with which the network devices can recognize the existence of the other network device in one-to-one communication by repeating the above-described processing.

On the other hand, the driver sending client 4000 can perform printing using an application via a printer driver. In addition, the driver sending client 4000 can acquire data scanned by the device 2000 via a scanner driver.

In the following description, the printer driver and the scanner driver are collectively and simply referred to as a "driver" where necessary. Furthermore, the driver sending client 4000 according to the present exemplary embodiment does not include a client agent having a function for installing the driver, which is a service program.

The communication line 5000 includes a common local area network (LAN) and an interactive serial interface, such as Institute of Electrical and Electronic Engineers (IEEE) 1394 or universal serial bus (USB).

In the present exemplary embodiment, the first device management application unit 1710 of the management server 1000 performs characteristic processing according to an exemplary embodiment of the present invention.

The first device management application unit 1710 includes a first program control unit 1711, a first device management control unit 1712, a first task management control unit 1713, a first driver management control unit 1714, a first information storage unit 1715, and a first driver storage unit 1716.

The first program control unit 1711 is a framework program unit for controlling each control unit, such as the first device management control unit 1712, the first task management control unit 1713, and the first driver management control unit 1714.

The first device management control unit 1712 performs processing for searching for the device 2000, processing for monitoring a status of the device 2000, and processing for changing the setting for the device 2000 via the first task management control unit 1713 with respect to each task. Furthermore, the first device management control unit 1712 performs a communication with the device 2000 via the first UPnP control unit 1720 and acquires device metadata when the UPnP control unit 1720 receives information indicating that the device 2000 having the UPnP function has been extracted as a result of the processing for searching for the device 2000.

As described above, the device 2000 includes the UPnP function. Therefore, in the following description, the device 2000 is also referred to as the "UPnP device 2000" where necessary.

Here, the device metadata includes data indicating an attribute of the device 2000 and data related to the driver for the device 2000. The data indicating the device attribute includes a device type and a device function. The device type indicates a type of the device 2000 (whether the device 2000 is a printing apparatus, a scanner, or a facsimile apparatus). The device function indicates the function of the device 2000.

For example, in the case where the device type is a printing apparatus and the printing apparatus includes a function other than the print function (for example, a facsimile transmission function), the device function includes the print function and the facsimile transmission function. Furthermore, for example, the print function can include information about what type of page description language is used, information about the printing speed, and information about what type of finishing function is included in the device 2000.

On the other hand, the data related to the driver includes driver location information and information about a function for downloading the driver itself.

Meanwhile, as represented by WSD utilized in UPnP, information described in Extensible Markup Language (XML) can be sent and received by utilizing a web service. Accordingly, the device metadata to be sent and received in the above-described manner can be freely selected.

The first driver management control unit 1714 performs sending processing for sending the client agent to the driver sending client 4000.

Furthermore, the first driver management control unit 1714 performs a communication using the web service with the sent client agent. In addition, the first driver management control unit 1714 sends the driver and issues an instruction for installing the driver. Note that the above-described processing performed by the first driver management control unit 1714 is performed via the first task management control unit 1713.

The first task management control unit 1713 controls the processing by the first device management control unit 1712 and the first driver management control unit 1714 with respect to each task as described above. To control the processing with respect to each task refers to scheduling and displaying a result of processing according to performance information described and instructed in a task.

Suppose here, for example, that the first driver management control unit 1714 has generated a driver task for sending a driver to a driver sending client 4000 and the driver task has been sent to the first task management control unit 1713.

In this case, when it comes to a timing for performing the instructed processing, the first task management control unit 1713 instructs the first driver management control unit 1714 to perform the task according to the driver task performance information.

Then, the first driver management control unit 1714 performs the driver task and sends a result of performing the driver task to the first task management control unit 1713. After receiving the result of performing the driver task, the first task management control unit 1713 performs processing for displaying the result of performing the driver task.

Here, in the present exemplary embodiment, the first device management application unit 1710 is a web application. Here, the user performs an operation for the first device management application unit 1710 via a third display unit 3100 and a third input unit 3200 of the administrator client 3000 via a web browser as an interface between them.

Note that it is also useful if the first device management application unit 1710 uses a normal native application rather than using the web application. In this case, an administrator of the printing system performs an operation for the first device management application unit 1710 via the first display unit 1100 and the first input unit 1200 of the management server 1000, not via the administrator client 3000.

The first program control unit 1711 performs processing for establishing a communication with a fourth UPnP control unit 4720, which is included in the fourth data control unit 4700 of the driver sending client 4000, via the first UPnP control unit 1720. Here, the fourth UPnP control unit 4720 is one of the functions of the OS that includes a driver installation function.

Furthermore, the first program control unit 1711 performs processing for performing a communication with the second remote control unit 2710 by using a protocol such as Simple Network Management Protocol (SNMP).

As described above, the first program control unit 1711 changes a setting for the device 2000. In the present exemplary embodiment, a case is described as an example where a setting for the device 2000 is a setting about UPnP.

In the present exemplary embodiment, the first information storage unit 1715 is a database. The first driver storage unit 1716 is a server that downloads a driver, such as a file transfer protocol (FTP) server, a hypertext transport protocol (HTTP) server, or a file server. Here, the first information storage unit 1715 and the first driver storage unit 1716 can be provided in the management server 1000 as illustrated in FIG. 1.

Here, it is also useful if at least one of the first information storage unit 1715 and the first driver storage unit 1716 is provided in a server different from the management server 1000.

The first information storage unit 1715 and the first driver storage unit 1716 receive an access by the first program control unit 1711, the first device management control unit 1712, the first task management control unit 1713, and the first driver management control unit 1714 and are utilized for storing necessary data.

Figure 2B:
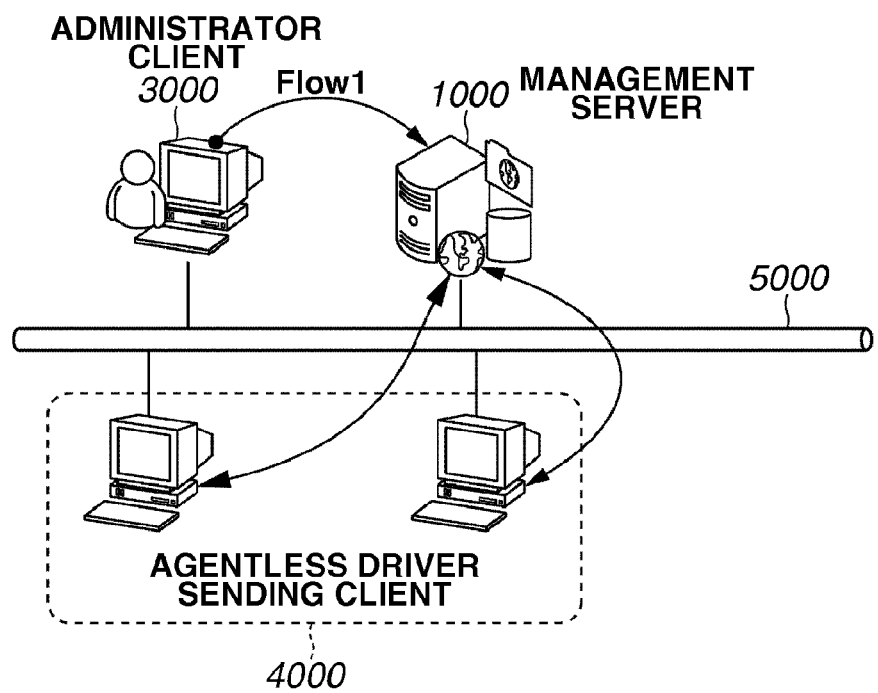

FIGS. 2A and 2B each illustrate an example of an operation of the printing system in the case where the management server 1000 includes a pseudo UPnP function corresponding to a UPnP function of the device 2000 according to the present exemplary embodiment. Note here that the function of the management server 1000 is referred to as a UPnP function where necessary in the following description.

FIG. 2A illustrates a state where the device 2000 has entered the network environment in which the management server 1000, the administrator client 3000, and the driver sending client 4000 are connected to the communication line 5000. In the present exemplary embodiment, it is supposed that a setting for performing a unicast UPnP with respect to the management server 1000 has been previously performed for the second UPnP control unit 2720 of the device 2000.

Accordingly, when the device 2000 enters the network, the second UPnP control unit 2720 of the device 2000 sends a network entry message (a Hello message in WSD, for example) to the management server 1000 by unicast.

FIG. 2B illustrates a state in which the driver is installed in the driver sending client 4000. In the example illustrated in FIG. 2B, a solid line arrow (Flow1) indicates that the driver is installed in the driver sending client 4000 utilizing the pseudo UPnP function of the device 2000.

Figure 3A:
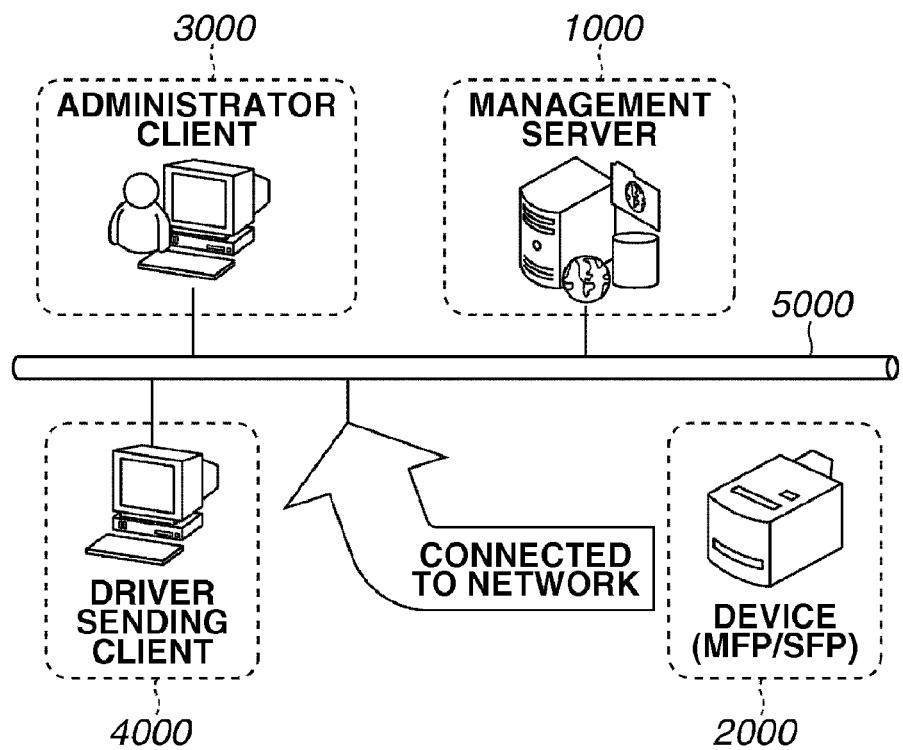
FIGS. 3A and 3B each illustrates an example of an operation of the printing system in the case where the management server does not include a pseudo UPnP function of the device and utilizes a remote setting function of the device according to an exemplary embodiment of the present invention.
Figure 3B:
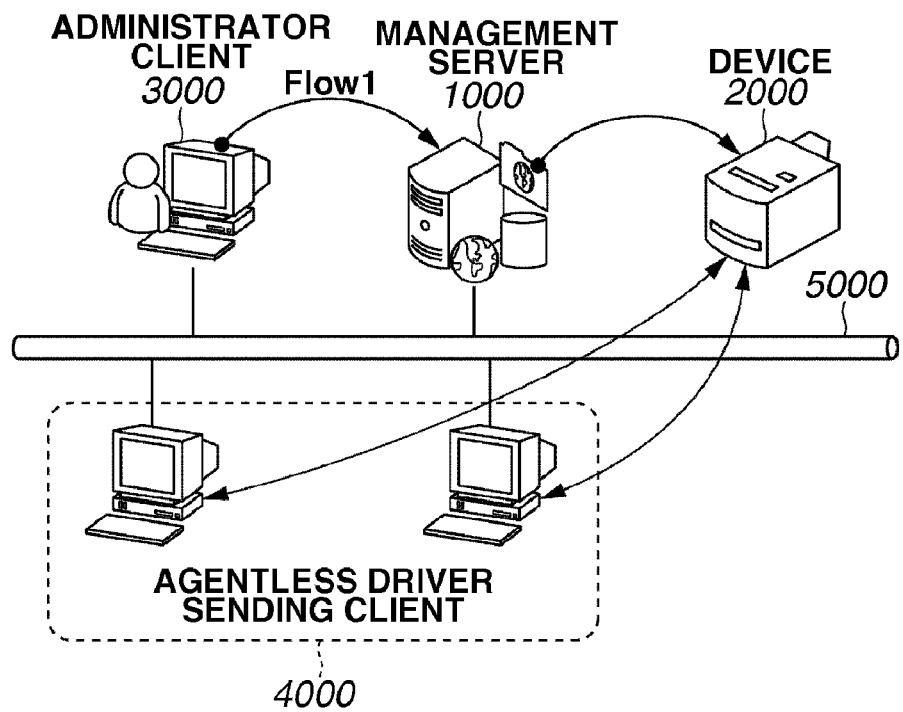

FIGS. 3A and 3B each illustrate an example of an operation of the printing system in the case where the management server 1000 does not include a pseudo UPnP function of the device 2000 and utilizes a remote setting function of the device 2000 according to the present exemplary embodiment.

FIG. 3A, as FIG. 2A does, illustrates a state where the device 2000 has entered the network environment in which the management server 1000, the administrator client 3000, and the driver sending client 4000 are connected to the communication line 5000.

As described above, when the device 2000 enters the network, the second UPnP control unit 2720 of the device 2000 sends a network entry message (a Hello message in WSD, for example) to the management server 1000 by unicast.

FIG. 3B a state in which the driver is installed in the driver sending client 4000. In the example illustrated in FIG. 3B, a solid line arrow (Flow1) indicates that a remote setting for performing the unicast UPnP to the driver sending client 4000 is set by the management server 1000 to the device 2000 and then the device 2000 installs the driver to the driver sending client 4000 by unicast UPnP.

Now, an example of a basic operation performed by the printing system according to the present exemplary embodiment will be described below with reference to the flow chart of FIG. 4. Before advancing to the processing in FIG. 4, the device 2000 performs UPnP by unicast (unicast UPnP) to the management server 1000 when the device 2000 is connected to the network (the communication line 5000).

After performing the above-described processing, in step S1 in FIG. 4, the management server 1000 performs UPnP device detection processing for detecting the device 2000 (the UPnP device).

In step S2, the management server 1000 performs UPnP device management processing for managing the device 2000 extracted in step S1. Then, the management server 1000 detects a driver corresponding to the device 2000 extracted in step S1.

In step S3, the management server 1000 performs automatic association processing for automatically associating the device 2000 extracted in step S1 with the extracted driver.

In step S4, the management server 1000 performs driver sending client information acquisition processing for acquiring information about the driver sending client 4000, which is a driver sending destination apparatus, according to a device attribute of the device 2000 extracted in step S1.

In step S5, the management server 1000 performs device capacity-correspondent processing for determining a capacity of the management server 1000 related to the pseudo UPnP function or a capacity related to the remote setting for the device 2000.

In step S6, the management server 1000 performs driver installation processing for installing the driver for the device 2000 on the driver sending client 4000 according to the capacity determined in step S5. Then, the processing ends.

Now, an example of an operation performed by the printing system according to the present exemplary embodiment will be described in detail below with reference to FIG. 5. Before advancing to the processing illustrated in FIG. 5, the processing for associating the device attribute with the driver sending client 4000 is performed before the device 2000 enters the network (the communication line 5000).

FIG. 5 is a flow chart that illustrates an example of an operation performed by the management server 1000 in associating the device attribute with the driver sending client 4000 according to the present exemplary embodiment. At first, the administrator of the printing system accesses the first device management application unit 1710 of the management server 1000 via the web browser by operating the third display unit 3100 and the third input unit 3200 of the administrator client 3000.

In this case, the first driver management control unit 1714 displays a menu for the first device management application unit 1710 on the third display unit 3100. Then, the administrator selects an "associate device attribute with client" item from the menu.

In this case, in step S100 in FIG. 5, the first driver management control unit 1714 displays a UI screen for associating the attribute of the device 2000 (the device attribute) with the client.

FIG. 6 illustrates an example of the UI screen displayed when the administrator selects the "associate device attribute with client" item according to the present exemplary embodiment.

Referring to FIG. 6, in a UI screen 600, a menu is displayed in a field 601, which is arranged in a left portion thereof, and a content corresponding to the menu is displayed in a field 602, which is arranged in a right portion thereof. When the administrator selects the "associate device attribute with client" item, a "select device attribute" screen is displayed in the right field 602 as illustrated in FIG. 6.

In step S110, the first driver management control unit 1714 inputs the attribute of the device 2000 to be associated with the driver sending client 4000 according to the selection by the administrator performed via the "select device attribute" screen.

In the present exemplary embodiment, as illustrated in FIG. 6, an Internet Protocol (IP) address, a color printing, a printing speed, and a finishing-bookbinding function are provided as the attribute of the device 2000. The administrator can perform a selection for each of the attributes of the device 2000 as follows.

The IP address attribute of the device 2000 refers to an IP address of the UPnP device 2000 including the UPnP function itself. In the example illustrated in FIG. 6, the devices 2000 whose IP address ranges from "aaa.bbb.ccc.100" to "aaa.bbb.ccc.110" are described.

The color printing attribute of the device 2000 refers to either a state where color printing (and monochromatic printing) can be performed or a state where monochromatic printing only can be performed. In the example illustrated in FIG. 6, the UPnP device 2000 that can perform the color printing is targeted.

The printing speed attribute of the device 2000 refers to a printing speed capacity of the UPnP device 2000. In the example illustrated in FIG. 6, the UPnP device 2000 having the printing speed of 40 pages per minute (ppm) or higher is targeted.

The finishing-bookbinding function attribute of the device 2000 refers to an attribute about whether to use a bookbinding function as a condition in the case where the bookbinding function is included in finishing functions of the UPnP device 2000. In the example illustrated in FIG. 6, the condition that the bookbinding function is included in the finishing functions of the UPnP device 2000 is not used.

Note that the above-described attributes are mere examples of the attributes of the device 2000. That is, various items can be used as the attribute of the device 2000 if the items indicate information that can be acquired by sending and receiving the device metadata by UPnP between the management server 1000 and the device 2000.

For example, in addition to or instead of the above-described attributes, a page description language (PDL), such as Printer Control Language (PCL) or PostScript (PS), or a point of destination of the device (the name of a country, such as Japan, the United States, or the United Kingdom) can be used as the attribute of the device 2000.

When the user (administrator) presses a "next" button 603 on the UI screen 600 illustrated in FIG. 6, the first driver management control unit 1714 performs the following processing. That is, in step S120, the first driver management control unit 1714 displays a UI screen for selecting the driver sending client 4000 to be associated with the attribute of the device 2000 set by the user via the UI screen 600.

Figure 7:
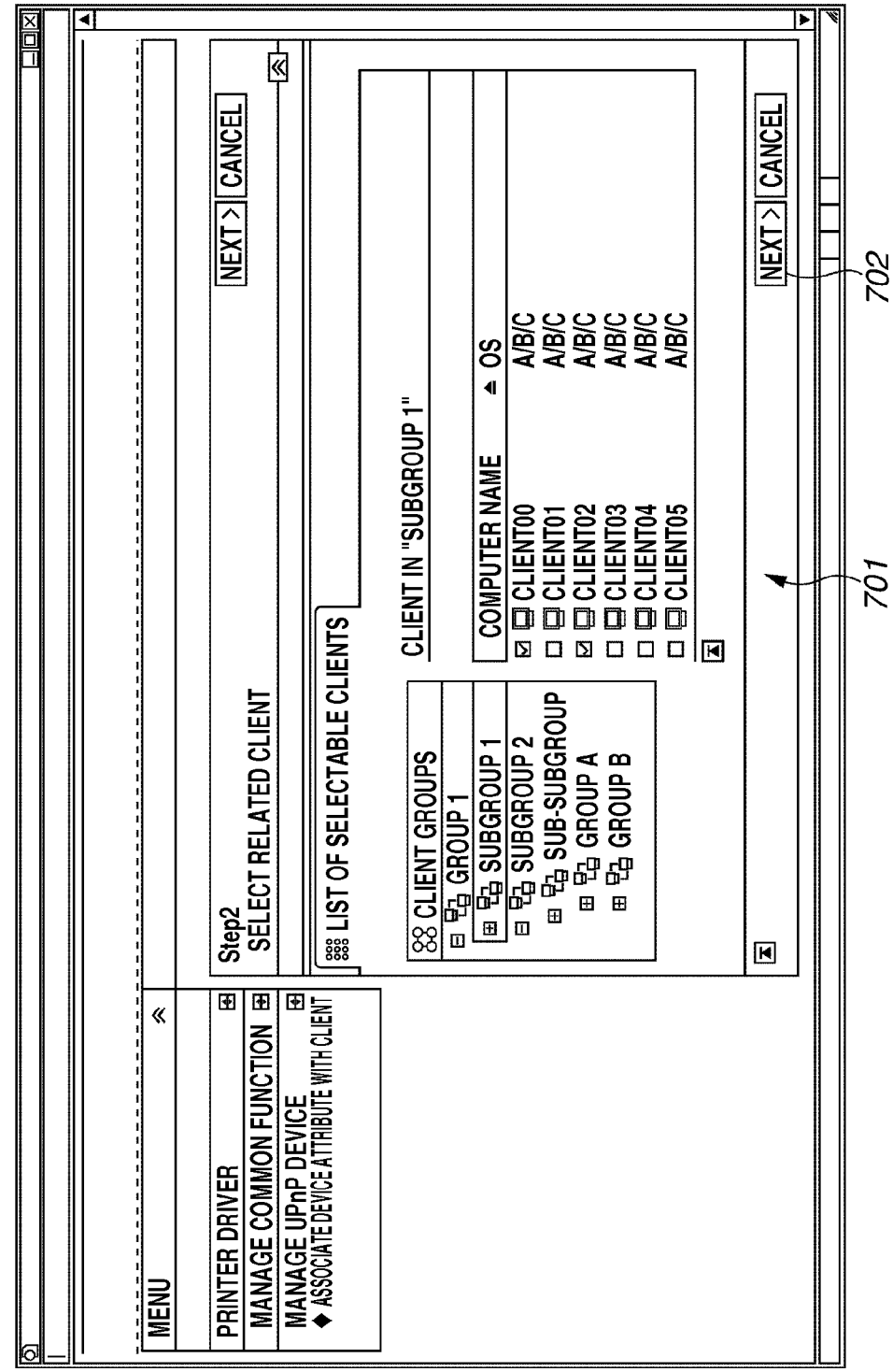
FIG. 7 illustrates an example of a UI screen for selecting a driver sending client to be associated with the device attribute according to an exemplary embodiment of the present invention.

FIG. 7 illustrates an example of the UI screen for selecting the driver sending client 4000 to be associated with the device attribute (the attribute of the device 2000) according to the present exemplary embodiment.

Referring to FIG. 7, a list of clients 701 displayed on a UI screen 700 illustrated in FIG. 7 is a list of the driver sending clients 4000. The content included in the list of clients 701 is previously stored on the first information storage unit 1715 by performing processing for searching for a client or by exporting a comma separated value (CSV) file.

In the example illustrated in FIG. 7, the driver sending client 4000 that belongs to an arbitrary client group in a tree is selected. However, the present invention is not limited to this. That is, the driver sending client 4000 can be selected with respect to each client group, instead of selecting the same with respect to each client.

FIG. 8 illustrates an example of a table related to the driver sending client 4000 that is previously stored on the first information storage unit 1715 according to the present exemplary embodiment. Referring to FIG. 8, a table 800 includes a client identification (ID) field, an OS name field, an IP address field, and a group relationship field.

In the example illustrated in FIG. 7, "CLIENT00" and "CLIENT02", which belong to a client group "subgroup 1 of group 1", have been selected as the driver sending client 4000 to be associated with the attribute of the device 2000.

In step S130, when the user presses a "next" button 702 on the UI screen 700 illustrated in FIG. 7, the management server 1000 verifies the content of the selection performed by the user via the UI screens 600 and 700 illustrated in FIG. 6 and FIG. 7 and displays a UI screen for registering the verified content.

Figure 9:
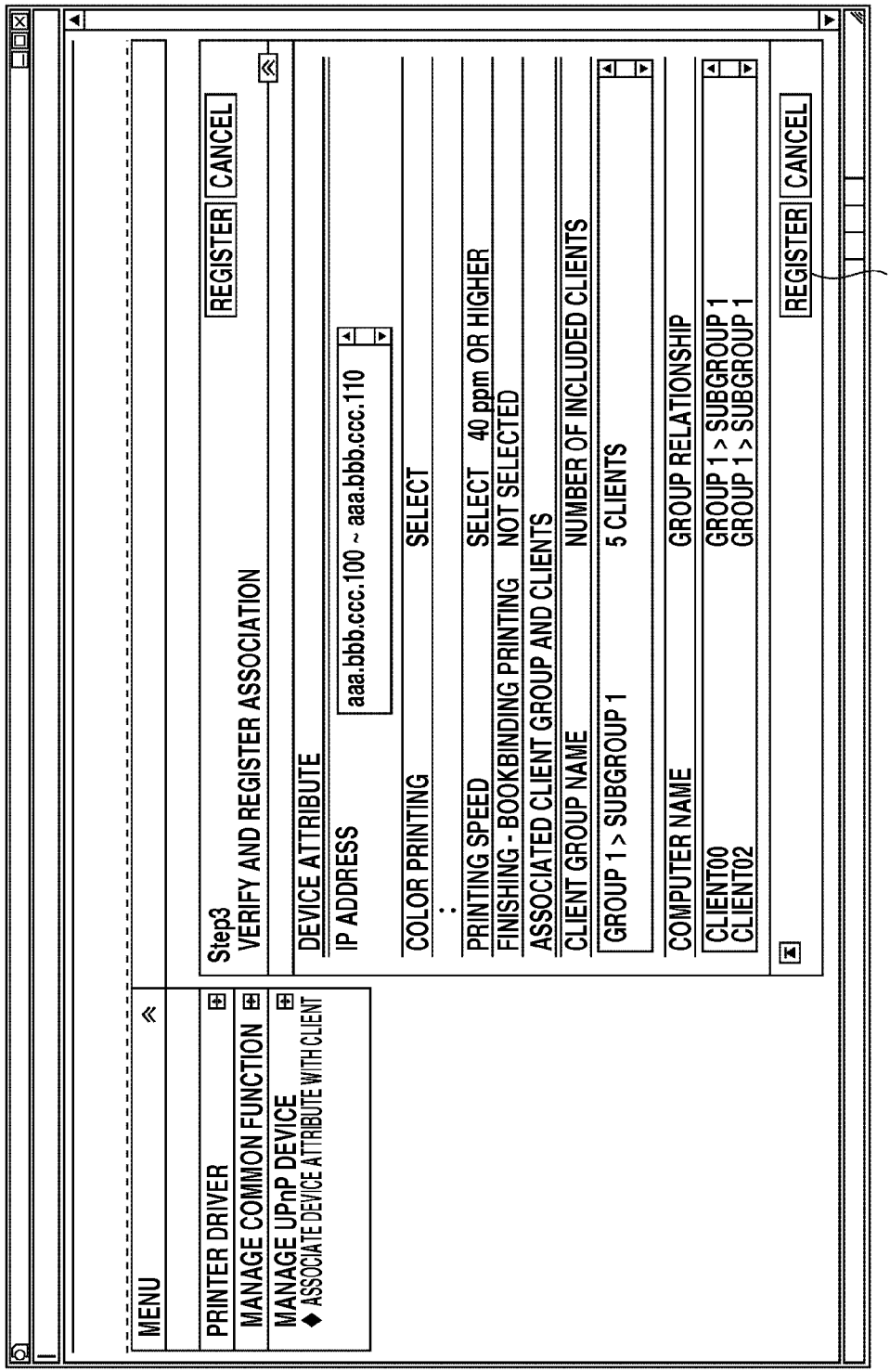
FIG. 9 illustrates an example of a UI screen for verifying and registering the content of a selection performed by the user via the UI screen illustrated in each of FIGS. 6 and 7 according to an exemplary embodiment of the present invention.

FIG. 9 illustrates an example of a UI screen for verifying and registering the content of a selection performed by the user via the UI screens 600 and 700 illustrated in FIGS. 6 and 7 according to the present exemplary embodiment.

Referring to FIG. 9, when the user presses a "register" button 901 on a UI screen 900 illustrated in FIG. 9, the first driver management control unit 1714 stores the content of a setting performed via the UI screens 600 and 700 illustrated in FIG. 6 and FIG. 7 on the first information storage unit 1715.

FIGS. 10 through 13 each illustrates an example of a table (tables 110, 111, 112, and 113) for storing the content of a setting performed by the user via the UI screen 600 illustrated in FIG. 6. FIG. 14 illustrates an example of a table 114 for storing the content of a setting performed by the user via the UI screen 700 illustrated in FIG. 7.

FIG. 15 illustrates an example of a table 115 for storing the device attribute (the attribute of the device 2000) and the driver sending client 4000 associated with each other according to the present exemplary embodiment. The tables 110 through 115, which are illustrated in FIGS. 10 through 15, are stored in the first information storage unit 1715 in step S130.

Among the examples of the tables 110 through 115 illustrated in FIG. 10 through FIG. 15, the table 115 illustrated in FIG. 15 is a main table. The table 115 illustrated in FIG. 15 associates a device attribute ID with the selected client ID and stores therein the mutually associated device attribute ID and the selected client ID.

The content of the device attribute ID is stored in the tables 110 through 113 illustrated in FIGS. 10 through 13, while the content of the selected client ID is stored in the table 114 illustrated in FIG. 14. For example, a device attribute ID "SelectedDevAttr-1" in FIG. 15 is associated with a selected client ID "SelectedClients-1".

Here, it is supposed that the attribute of the device 2000 matches the content of the selected client ID "SelectedDevAttr-1". In this case, the driver corresponding to the device 2000 is installed on the driver sending client 4000 having the selected client ID "SelectedClients-1".

The device attribute ID "SelectedDevAttr-1" is constituted by columns, such as a device attribute ID column, an IP address ID column, a color printing column, a printing speed ID column, and a finishing ID column, as illustrated in FIG. 10. Detailed contents of the IP address ID, the printing speed ID, and the finishing ID are stored in the tables 111 through 113 illustrated in FIGS. 11 through 13, respectively.

FIG. 11 illustrates an example of a subtable corresponding to the IP address ID stored in the table 110 illustrated in FIG. 10. In the table 110 illustrated in FIG. 10, an IP address ID "IPID-1" is stored as the IP address ID corresponding to the device attribute ID "SelectedDevAttr-1".

In the table 111 illustrated in FIG. 11, the IP addresses ranging from "aaa.bbb.ccc.100" to "aaa.bbb.ccc.110" are stored as the IP addresses corresponding to the IP address ID "IPID-1".

FIG. 12 illustrates an example of a subtable corresponding to the printing speed ID stored in the table 110 illustrated in FIG. 10.

In the table 110 illustrated in FIG. 10, the printing speed ID "PVID-1" is stored as the printing speed ID corresponding to the device ID "SelectedDevAttr-1". In the table 112 illustrated in FIG. 12, the printing speed whose printing speed attribute is "40" and whose condition attribute is "ppm or higher" is stored as the printing speed corresponding to the printing speed ID "PVID-1".

FIG. 13 illustrates an example of a subtable corresponding to the finishing ID stored in the table 110 illustrated in FIG. 10. In the table 110 illustrated in FIG. 10, a parameter "OFF" is stored as the finishing ID corresponding to the device ID "SelectedDevAttr-1". In this case, the finishing attribute is not used.

On the other hand, in the device ID illustrated in FIG. 10, the finishing ID for the device ID "SelectedDevAttr-2" is "FinID-1". Accordingly, in the table 113 illustrated in FIG. 13, the bookbinding function is stored as the finishing attribute corresponding to the finishing ID "FinID-1".

FIG. 14 illustrates an example of a subtable corresponding to the selected client ID of the table 115 illustrated in FIG. 15. In the table 114 illustrated in FIG. 14, "CLIENT00" and "CLIENT02" are stored as the driver sending client 4000 corresponding to the selected client ID "SelectedClients-1". Furthermore, the detailed contents of the "CLIENT00" and "CLIENT02" are stored in the table 800 illustrated FIG. 8.

Thus, in the examples described above, the following contents are selected (as illustrated in FIGS. 10 through 13):

IP address attribute: IP addresses ranging from "aaa.bbb.ccc.100" to "aaa.bbb.ccc.110"

Color printing attribute: available

Printing speed attribute: 40 ppm or higher.

When the above-described UPnP device 2000 has been extracted as a result of the search, the driver is installed on the driver sending clients 4000 ("CLIENT00" and "CLIENT02"), as illustrated in FIG. 14 and FIG. 15.

As described above, in the present exemplary embodiment, an exemplary registration unit is implemented by performing at least the processing in the flow chart of FIG. 5.

Now, an operation performed by the printing system according to the present exemplary embodiment will be described in detail below with reference to flow charts of FIGS. 16A through 16D. To begin with, the UPnP device detection processing in step S1 in FIG. 4 will be described below.

Figure 16A:
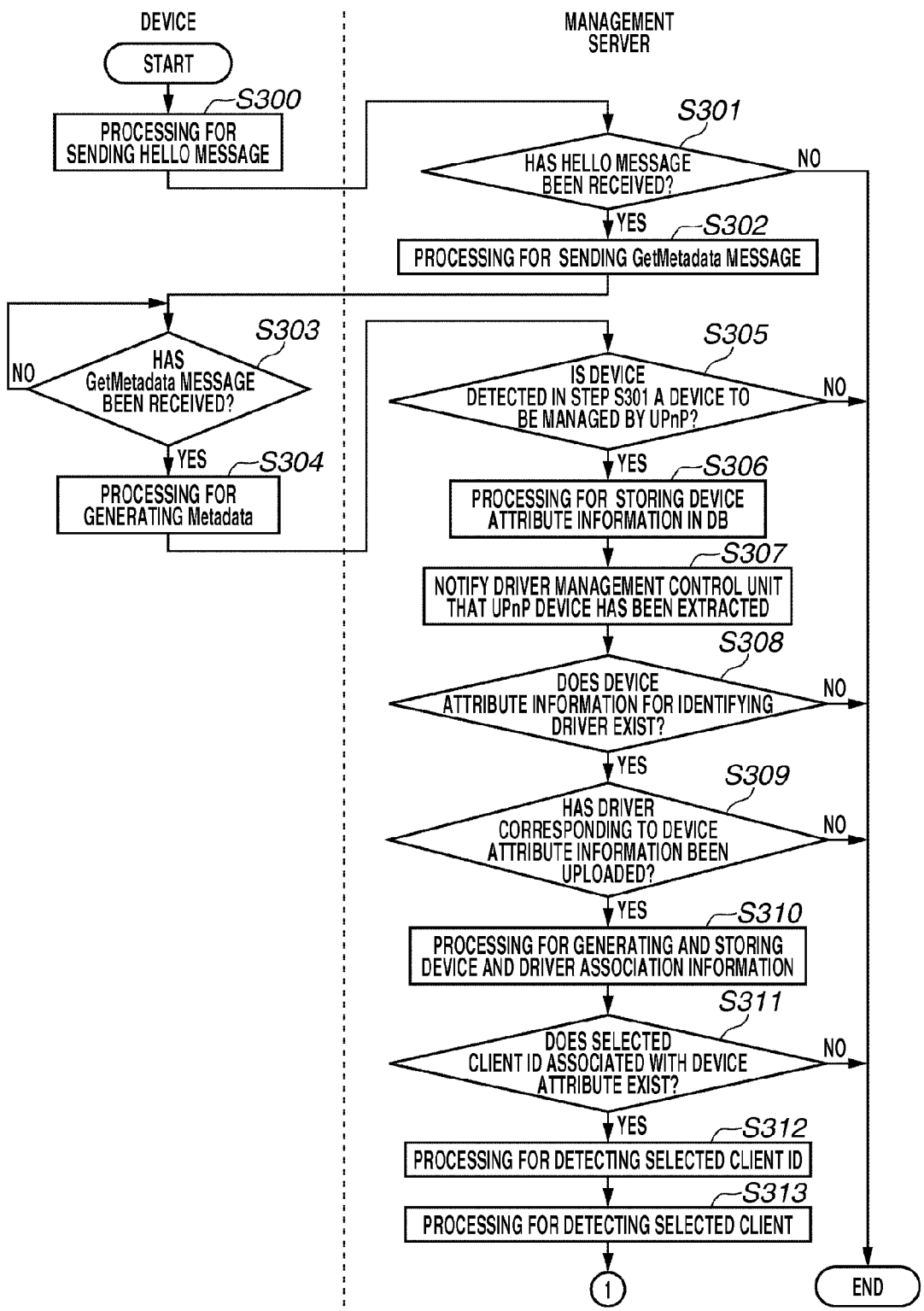
FIG. 16A is a flow chart that illustrates in detail an example of an operation performed in the printing system according to an exemplary embodiment of the present invention.

Referring to FIG. 16A, when the device 2000 is connected to the network (enters the network (the communication line 5000)), in step S300, the UPnP control unit 2720 sends a network entry message, which indicates that a new device has entered the network, to the management server 1000 by unicast. In the present exemplary embodiment, the UPnP control unit 2720 sends a Hello message, which is defined by WSD as the network entry message, to the management server 1000 by unicast. As described above, the device 2000 sends a Hello message to only the management server 1000.

In step S301, the first device management control unit 1712 of the management server 1000 determines whether the message received via the first UPnP control unit 1720 is the Hello message.

If it is determined as a result of the determination in step S301 that the received message is not the Hello message (NO in step S301), then the processing in the flow charts of FIGS. 16A through 16D ends.

On the other hand, if it is determined as a result of the determination in step S301 that the received message is the Hello message (YES in step S301), then the processing advances to step S302.

As described above, in the present exemplary embodiment, an exemplary receiving unit is implemented by performing at least the processing of step S301.

In step S302, the first device management control unit 1712 sends a reply message replying to the network entry message to the device 2000 via the second UPnP control unit 2720 and the first UPnP control unit 1720.

The sending of the reply message is performed to acquire the device metadata. Here, a GetMetadata message defined by WSD is sent as the reply message.

In step S303, the first device management control unit 1712 waits until the device 2000 acquires the GetMetadata message via the second UPnP control unit 2720 and the first UPnP control unit 1720.

After acquiring the GetMetadata message, the UPnP control unit 2720 of the device 2000 sends metadata (device metadata) to the management server 1000 via the network in step S304 (the communication line 5000).

As described above, the metadata (the device metadata) includes data indicating the attribute of the device 2000 and data related to the driver for the device 2000. The details of the UPnP device detection processing in step S1 in FIG. 4 are as described above in steps S300 through S304.

Now, the UPnP device management processing in step S2 in FIG. 4 will be described in detail below. Here, the first device management control unit 1712 acquires the metadata sent in step S304.

In step S305, the first device management control unit 1712 determines whether the device 2000 extracted in step S301 is a device to be managed by UPnP based on the acquired metadata.

In the present exemplary embodiment, the determination in step S305 is performed by determining whether the device 2000 is a device that includes a print function and whether the device 2000 is a device of a vendor to be managed by UPnP based on the acquired metadata.

As described above, in the present exemplary embodiment, an exemplary second receiving unit is implemented by performing at least the processing in step S305.

If it is determined in step S305 that the device 2000, which is a communication target apparatus, is not a device to be managed by UPnP (NO in step S305), then the processing in the flow chart of FIGS. 16A through 16D ends. On the other hand, if it is determined in step S305 that the device 2000, which is a communication target apparatus, is a device to be managed by UPnP (YES in step S305), then the processing advances to step S306.

In step S306, the first device management control unit 1712 stores information that indicates the attribute of the device 2000, which is included in the acquired metadata and necessary to send the driver, on the first information storage unit 1715.

Note here that in the following description, the information indicating the attribute of the device 2000 is simply referred to as "device attribute information" where necessary. Here, it is supposed that the device 2000 of the device number "Dev-1" including the print function has been extracted and that the metadata is acquired having the following contents according to the acquired metadata therefor:

Media access control (MAC) address: AA-BB-CC-DD-EE-01
UPnP ID: UPnP_4E0F
IP address: aaa.bbb.ccc.101
Color printing: COLOR
Printing speed: 40
Finishing function: None.

Here, the color printing "COLOR" indicates that the extracted device 2000 includes the color print function.

Furthermore, the printing speed "40" indicates that the printing speed of the extracted device 2000 is 40 ppm. In addition, the finishing function "None" indicates that the extracted device 2000 includes only a normal discharge port function and includes no finishing function.

FIG. 17 illustrates an example of a table for storing the device attribute information on the first information storage unit 1715 according to the present exemplary embodiment.

Referring to FIG. 17, in a table 230, various information about the UPnP device 2000 associated with one another is registered. The information stored in the table 230 includes the MAC address, the UPnP ID, the IP address, information about whether the color printing is available, the printing speed, and the finishing function. Note that the MAC address is used to identify devices of the same type.

Furthermore, the UPnP ID refers to an ID for UPnP described in an INF description in the driver. That is, if the UPnP ID is recognized, it can be determined whether the driver is compliant with the device 2000 by referring to the content of the INF description in the driver.

In step S307, the first device management control unit 1712 notifies the first driver management control unit 1714 that the UPnP device 2000 has been extracted and the device attribute information has been stored on the first information storage unit 1715. With respect to the notification, a communication method such as the web service can be used.

Here, it is also useful if the first driver management control unit 1714 periodically monitors whether the device attribute information has been described in a file or stored in the database instead of performing the above-described notification. The details of the UPnP device management processing in step S2 in FIG. 4 are as described above in steps S305 through S307.

Now, the processing for automatically associating the UPnP device with the driver in step S3 in FIG. 4 will be described in detail below.

In step S308, the first driver management control unit 1714 accesses the first information storage unit 1715 and determines whether the device attribute information for identifying the driver exists.

If it is determined in step S308 that the device attribute information for identifying the driver does not exist (NO in step S308), then the processing in the flow charts of FIGS. 16A through 16D ends. On the other hand, if it is determined in step S308 that the device attribute information for identifying the driver exists (YES in step S308), then the processing advances to step S309.

Here, it is supposed that the UPnP ID "UPnP_4E0F" has been acquired as the UPnP ID in the device attribute information stored in step S306 (see FIG. 17).

In step S309, the first driver management control unit 1714 accesses the first driver storage unit 1716 and determines whether a driver that matches the UPnP ID that has been acquired in step S306 exists.

If it is determined in step S309 that no driver that matches the UPnP ID that has been acquired in step S306 exists (NO in step S309), then the processing in the flow chart of FIGS. 16A through 16D ends.

On the other hand, if it is determined in step S309 that a driver that matches the UPnP ID that has been acquired in step S306 exists (YES in step S309), then the processing advances to step S310.

FIG. 18 illustrates an example of a table for storing the driver information on the first driver storage unit 1716 according to the present exemplary embodiment. Referring to FIG. 18, in a table 240, the driver ID and the UPnP ID associated with each other are registered.

In the above-described example, in step S309, the first driver management control unit 1714 determines that the "DRIVER00" is the driver that is determined to match the UPnP ID in step S309 (see FIG. 17 and FIG. 18).

In this case, the device 2000 whose device number is "Dev-1" and whose UPnP ID is "UPnP_4E0F" is associated with the driver whose driver ID is "DRIVER00" (see FIG. 17 and FIG. 18).

In this regard, in step S310, the first driver management control unit 1714 associates the device 2000 whose device number is "Dev-1" with the driver whose driver ID is "DRIVER00" and stores information indicating the mutually associated device 2000 and driver in the first information storage unit 1715.

FIG. 19 illustrates an example of a table for storing the device 2000 and the driver associated with each other in the first information storage unit 1715 according to the present exemplary embodiment. In the example illustrated in FIG. 19, in a table 250, the association ID, the device number, and the driver ID, which are associated with one another, are registered.

More specifically, in the table 250 illustrated in FIG. 19, the device number "Dev-1" and the driver ID "DRIVER00" are associated with the association ID "Connect-01". As described above, in the present exemplary embodiment, an exemplary association unit is implemented by performing at least the processing in step S310.

The details of the processing for automatically associating the UPnP device with the driver in step S3 in FIG. 4 are as described above in steps S308 through S310.

Now, the driver sending client information acquisition processing in step S4 in FIG. 4 will be described in detail below. Before advancing to step S311, the first driver management control unit 1714 has accessed the table 110 stored on the first information storage unit 1715 (see FIG. 10).

In step S311, the first driver management control unit 1714 determines whether a device attribute ID that matches the device attribute information registered in the table 230 (FIG. 17) exists and whether a selected client ID associated with the device attribute ID exists.

If it is determined in step S311 that no device attribute ID that matches the device attribute information registered in the table 230 (FIG. 17) exists and no selected client ID associated with the device attribute ID exists (NO in step S311), then the processing in the flow chart in FIGS. 16A through 16D ends.

On the other hand, if it is determined in step S311 that a device attribute ID that matches the device attribute information registered in the table 230 (FIG. 17) exists and a selected client ID associated with the device attribute ID exists (YES in step S311), then the processing advances to step S312. In the above-described example, the device attribute information registered in the table 230 matches the device attribute ID "SelectedDevAttr-1" having the content described in the tables 111 through 113 illustrated in FIGS. 11 through 13.

In step S312, the first driver management control unit 1714 accesses the table 115 illustrated in FIG. 15 and extracts the selected client ID associated with the device attribute ID that has been determined to match the device attribute information registered in the table 230.

In the above-described example, the selected client ID "SelectedClients-1" that is associated with the device attribute ID "SelectedDevAttr-1", which has been determined to match the device attribute information registered in the table 230 in step S311, is extracted.

In step S313, the first driver management control unit 1714 accesses the table 114 illustrated in FIG. 14 and extracts the selected client associated with the selected client ID extracted in step S312. In the above-described example, it is detected that the clients "CLIENT00" and "CLIENT02" are driver sending destination clients according to the selected client ID "SelectedClients-1".

The details of the driver sending client information acquisition processing in step S4 in FIG. 4 are as described above in steps S311 through S313.

Figure 16B:
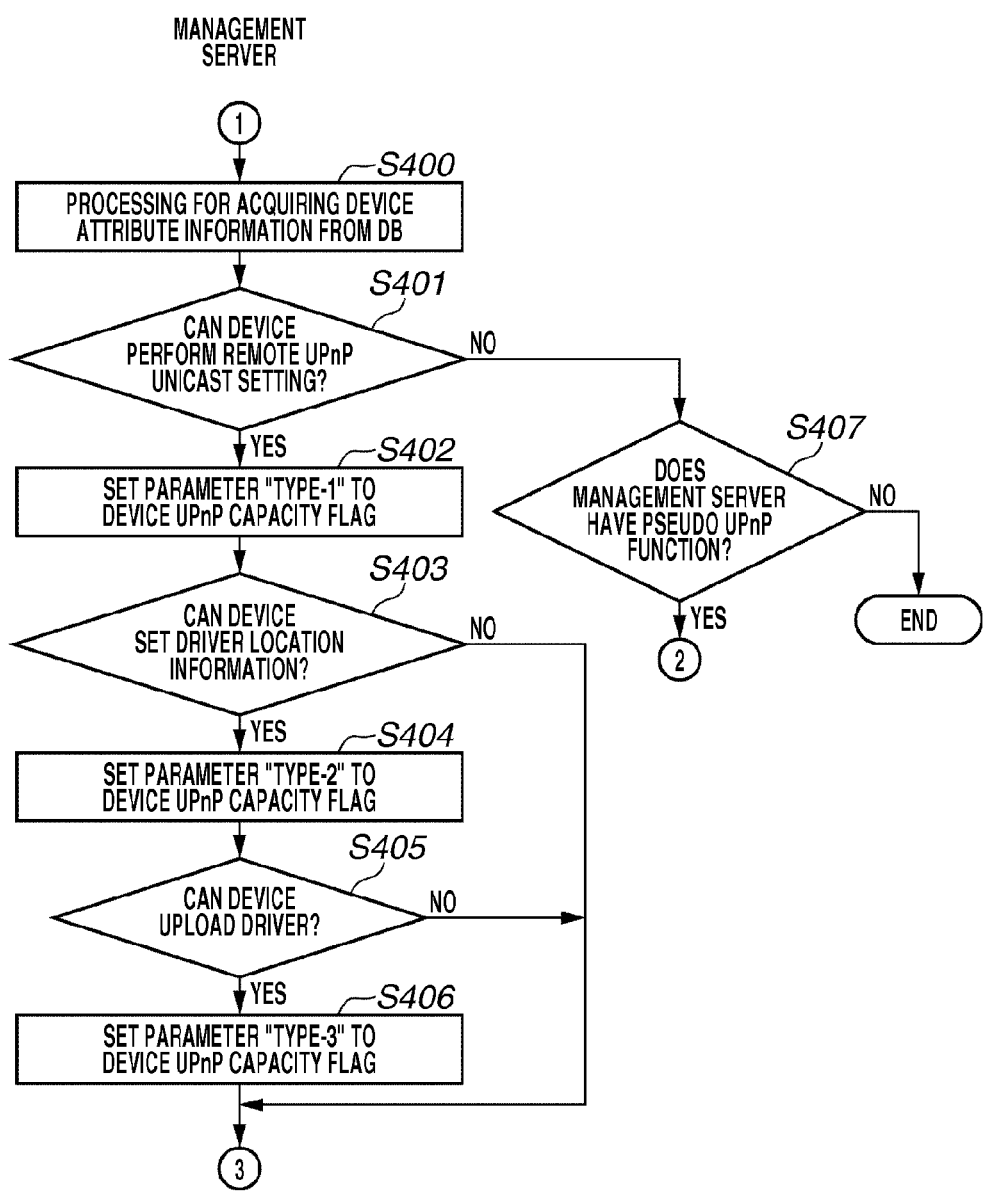
FIG. 16B is a flow chart that illustrates processing performed subsequent to the processing in FIG. 16A according to an exemplary embodiment of the present invention.

Now, the device capacity-correspondent processing in step S5 in FIG. 4 will be described in detail below with reference to FIG. 16B. In step S400 in FIG. 16B, the first driver management control unit 1714 accesses the first information storage unit 1715 and acquires the device attribute information stored by the first device management control unit 1712 on the first information storage unit 1715 in step S306.

In the above-described example, the attribute information for the device whose device number is "Dev-1" is acquired from the table 230 illustrated FIG. 17.

In step S401, the first driver management control unit 1714 determines whether the second UPnP control unit 2720 of the device 2000 can perform the remote UPnP unicast setting.

If it is determined in step S401 that the second UPnP control unit 2720 of the device 2000 can perform the remote UPnP unicast setting (YES in step S401), then the processing advances to step S402.

On the other hand, if it is determined in step S401 that the second UPnP control unit 2720 of the device 2000 cannot perform the remote UPnP unicast setting (NO in step S401), then the processing advances to step S407. In step S407, the first driver management control unit 1714 determines whether the pseudo UPnP processing can be performed.

If it is determined in step S407 that the pseudo UPnP processing cannot be performed (NO in step S407), then the processing in the flow chart of FIGS. 16A through 16D ends. On the other hand, if it is determined in step S407 that the pseudo UPnP processing can be performed (YES in step S407), then the processing advances to step S500 in FIG. 16C.

Then, the first driver management control unit 1714 performs the pseudo UPnP processing with respect to the device 2000. Here, the pseudo UPnP processing refers to executing the pseudo UPnP function.

More specifically, in the pseudo UPnP processing, the Hello message and the metadata from the UPnP control unit 2720 acquired by the first device management control unit 1712 in steps S301 and S305 can be generated and sent.

As described above, in the present exemplary embodiment, an exemplary determination unit is implemented by performing at least the processing in steps S401 and S407. That is, the capacity of performing the pseudo UPnP processing is an example of a capacity of installing the driver by plug-and-play according to the search protocol in one-to-one connection.

Now, the pseudo UPnP processing performed by the first driver management control unit 1714 will be described in detail below with reference to FIG. 16C.

Referring to FIG. 16C, in step S500, the first driver management control unit 1714 generates the Hello message that the first device management control unit 1712 has acquired in step S301.

Here, an address of the management server 1000 is used as a reply destination described in the Hello message ("ReplyTo").

Note here that it is also useful if the Hello message is obtained in the following manner in step S500, instead of creating the Hello message.

That is, it is also useful if the Hello message acquired by the first device management control unit 1712 in step S301 is stored by the first device management control unit 1712 on the first information storage unit 1715 and the Hello message thus obtained is used.

In this case, the first driver management control unit 1714 reads the Hello message from the first information storage unit 1715 and obtains the Hello message indicating the management server 1000 as the reply destination according to the read Hello message.

In step S501, the first driver management control unit 1714 sends the Hello message to the driver sending client 4000 that is a sending destination apparatus. In the above-described example, the Hello message is sent to the driver sending clients 4000 of client IDs "CLIENT00" and "CLIENT02", which are the sending destinations of the driver of the driver ID "DRIVER00" that has been associated with the device 2000 whose device number is "Dev-1".

In step S502, the fourth UPnP control unit 4720 of the driver sending client 4000 waits until the Hello message is received.

After the Hello message is received, in step S503, the fourth UPnP control unit 4720 sends the GetMetadata message to the first UPnP control unit 1720 to request the UPnP control unit 1720 to acquire the device metadata.

In step S504, the first driver management control unit 1714 waits until the GetMetadata message is acquired via the first UPnP control unit 1720. After acquiring the GetMetadata message (YES in step S504), in step S505, the first driver management control unit 1714 generates a metadata message.

In the above-described example, the first driver management control unit 1714 generates the metadata message based on the device attribute information for the "Dev-1" illustrated in FIG. 17 and the information about the driver ID "DRIVER00" corresponding to the device number "Dev-1".

Here, the information about the driver ID "DRIVER00" corresponding to the device number "Dev-1" refers to address information indicating the location of the driver whose driver ID is "DRIVER00" stored on the first driver storage unit 1716.

In step S506, the first driver management control unit 1714 sends the metadata message generated in step S505 to the fourth UPnP control unit 4720 via the first UPnP control unit 1720.

In step S507, the fourth UPnP control unit 4720 waits until the metadata message sent in step S506 is acquired.

After acquiring the metadata message, in step S508, the fourth UPnP control unit 4720 analyzes the acquired metadata message. More specifically, the fourth UPnP control unit 4720 acquires connection destination information such as an IP address of the device 2000 and location information about the driver whose driver ID is "DRIVER00" from the metadata message.

In step S509, the fourth UPnP control unit 4720 installs the driver. The processing for installing the driver includes processing for prompting the user to perform an operation necessary for installing the driver by issuing a request to the fourth display unit 4100 for installing the driver by displaying a graphic user interface (GUI). Then, the processing in the flow charts of FIGS. 16A through 16D ends.

As described above, in the present exemplary embodiment, an exemplary processing unit is implemented by performing at least the processing in steps S500, S501, S504, and S506.

If it is determined in step S401 (FIG. 16B) that the UPnP control unit 2720 can perform the remote UPnP unicast setting (YES in step S401), then the processing advances to step S402. The processing in step S402 will be described in detail below.

Here, in the remote UPnP unicast setting, the second remote control unit 2710 prompts the UPnP control unit 2720 to perform the UPnP by externally setting a plurality of IP addresses and a plurality of computer names as a part of the device setting. In the present exemplary embodiment, to "externally set" (a plurality of IP addresses and a plurality of computer names) indicates that the first device management control unit 1712 performs the device setting via the first task management control unit 1713.

In the device setting, SNMP is usually used for the MIB setting. A vendor-unique protocol is used for a vendor-unique device setting. The same applies to the present exemplary embodiment. That is, the UPnP unicast setting is used as a part of the device setting.

Furthermore, the determination as to whether the UPnP unicast setting can be performed is performed by the first driver management control unit 1714 by inquiring the second remote control unit 2710 of the device setting capacity of the device 2000 and according to a reply to the inquiry. That is, the first device management control unit 1712 inquires of the second remote control unit 2710 whether the remote UPnP setting can be performed by unicast via the first task management control unit 1713.

Then, the first device management control unit 1712 determines whether the UPnP unicast setting can be performed based on a reply to the inquiry. Note here that the first device management control unit 1712 uses SNMP or a unique protocol to issue the inquiry to the second remote control unit 2710 of the device 2000.

In step S402, the first driver management control unit 1714 sets a parameter "Type-1" with respect to the first information storage unit 1715 as the device UPnP capacity flag.

FIG. 20 illustrates an example of a table for storing the device UPnP capacity flag on the first information storage unit 1715 according to the present exemplary embodiment.

Here, the device UPnP capacity flag is a flag that indicates the UPnP setting capacity, which is the capacity of the device 2000 for performing a setting of UPnP by unicast based on the externally set setting. Note that the device UPnP capacity flag can be stored on a memory, a registry, or a file other than the first information storage unit 1715.

In step S403, the first driver management control unit 1714 determines whether the second UPnP control unit 2720 of the device 2000 can set the location information about the driver to be installed as a part of the device setting.

In the present exemplary embodiment, the first driver management control unit 1714 determines whether the UPnP control unit 2720 of the device 2000 can set the location information about the driver whose driver ID is "DRIVER00" as a part of the device setting. Here, the driver location information refers to an address used for acquiring the driver to be installed from the first driver storage unit 1716 that stores the driver. Furthermore, the determination is performed based on the device metadata acquired in step S305 (FIG. 16A).

If it is determined in step S403 that the UPnP control unit 2720 of the device 2000 cannot set the driver location information for the driver to be installed as a part of the driver setting (NO in step S403), then the processing advances to step S600 in FIG. 16D. On the other hand, if it is determined in step S403 that the UPnP control unit 2720 of the device 2000 can set the driver location information for the driver to be installed as a part of the driver setting (YES in step S403), then the processing advances to step S404.

In step S404, the first driver management control unit 1714 sets a parameter "Type-2" as the device UPnP capacity flag in a table 260 illustrated in FIG. 20 stored on the first information storage unit 1715.

In step S405, the first driver management control unit 1714 determines whether the UPnP control unit 2720 of the device 2000 can upload the driver to be installed itself to the second storage unit 2400 of the device 2000. In the present exemplary embodiment, the first driver management control unit 1714 determines whether the second UPnP control unit 2720 of the device 2000 can upload the driver itself whose driver ID is "DRIVER00" to the second storage unit 2400 of the device 2000.

Here, to upload the driver refers to storing the driver to be installed from the first driver storage unit 1716 that stores the driver to the second storage unit 2400 of the device 2000. The determination is performed based on the device metadata acquired in step S305.

If it is determined in step S405 that the UPnP control unit 2720 of the device 2000 cannot upload the driver to be installed itself to the second storage unit 2400 of the device 2000 (NO in step S405), then the processing advances to step S600 in FIG. 16D. On the other hand, if it is determined in step S405 that the UPnP control unit 2720 of the device 2000 can upload the driver to be installed itself to the second storage unit 2400 of the device 2000 (YES in step S405), then the processing advances to step S406.

In step S406, the first driver management control unit 1714 sets a parameter "Type-3" as the device UPnP capacity flag in the table 260 illustrated in FIG. 20 that is stored on the first information storage unit 1715.

Here, each of Type-1, Type-2, and Type-3 is an example of the information about the capacity for installing the driver according to the search protocol for one-to-one connection.

As described above, in the present exemplary embodiment, the first driver management control unit 1714 determines the type of the device UPnP capacity from among the three types (Type-1, Type-2, and Type-3) according to (the level of) the capacity of the device 2000 related to UPnP. Then, the first driver management control unit 1714 stores the result of the determination in the table 260 stored on the first information storage unit 1715.

Now, the processing to be performed subsequent to the device capacity-correspondent processing in step S5 in FIG. 4 and the processing for installing the driver in step S6 in FIG. 4 will be described in detail below with reference to FIG. 16D according to the present exemplary embodiment.

Referring to FIG. 16D, in step S600, the first driver management control unit 1714 refers to the table 260 stored in the first information storage unit 1715 to acquire a setting value set for the device UPnP capacity flag registered in the table 260 and determines the type set as the device UPnP capacity flag.

If it is determined in step S600 that the parameter "Type-1" has been set as the setting value for the device UPnP capacity flag, then the processing advances to step S601. If it is determined in step S600 that the parameter "Type-2" has been set as the setting value for the device UPnP capacity flag, then the processing advances to step S602. If it is determined in step S600 that the parameter "Type-3" has been set as the setting value for the device UPnP capacity flag, then the processing advances to step S603.

As described above, in the present exemplary embodiment, an exemplary second determination unit is implemented by performing at least the processing of step S600.

If it is determined in step S600 that the parameter "Type-1" has been set as the setting value for the device UPnP capacity flag, then in step S601, the first driver management control unit 1714 issues an instruction to the first device management control unit 1712 for generating a task including the IP address information about the driver sending client 4000, which is a sending destination apparatus. In the above-described example, the first driver management control unit 1714 instructs the first device management control unit 1712 to generate a task including the IP address information for "CLIENT00" and "CLIENT02" (see FIG. 8 and FIG. 14).

As described above, in the present exemplary embodiment, the device 2000 includes a first capacity if it is determined in step S600 that the parameter "Type-1" has been set as the setting value for the device UPnP capacity flag.

If it is determined in step S600 that the parameter "Type-2" has been set as the setting value for the device UPnP capacity flag, then in step S602, the first driver management control unit 1714 issues the following instruction to the first device management control unit 1712.

That is, the first driver management control unit 1714 instructs the first device management control unit 1712 to generate a task including the IP address information for the driver sending client 4000, which is a sending destination apparatus, and the information about the location of the driver to be installed.

In the above-described example, the first driver management control unit 1714 instructs the first device management control unit 1712 to generate a task including the IP address information for "CLIENT00" and "CLIENT02" and the location information about "DRIVER00". As described above, in the present exemplary embodiment, the device 2000 includes a second capacity if it is determined in step S600 that the parameter "Type-2" has been set as the setting value for the device UPnP capacity flag.

If it is determined in step S600 that the parameter "Type-3" has been set as the setting value for the device UPnP capacity flag, then in step S603, the first driver management control unit 1714 issues the following instruction to the first device management control unit 1712. That is, the first driver management control unit 1714 instructs the first device management control unit 1712 to generate a task including the IP address information about the driver sending client 4000, which is a sending destination apparatus, and the driver to be installed.

In the above-described example, the first driver management control unit 1714 instructs the first device management control unit 1712 to generate a task including the IP address information for "CLIENT00" and "CLIENT02" and the driver "DRIVER00". As described above, in the present exemplary embodiment, the device 2000 includes a third capacity if it is determined in step S600 that the parameter "Type-3" has been set as the setting value for the device UPnP capacity flag.

In step S604, the first device management control unit 1712 generates the device setting task to be immediately performed according to the above-described instruction from the first driver management control unit 1714. Then, the first device management control unit 1712 registers the generated device setting task on the first task management control unit 1713. In step S605, the first task management control unit 1713 sends the device setting task registered in step S604 to the second remote control unit 2710.

As described above, in the present exemplary embodiment, an exemplary processing unit is implemented by performing at least the processing of steps S601 through S605.

In step S606, the second remote control unit 2710 of the device 2000 waits until the device setting task sent in step S605 is acquired.

After acquiring the device setting task in step S606, the processing advances to step S607. In step S607, the second remote control unit 2710 issues an instruction according to the content of the acquired device setting task to the UPnP control unit 2720. That is, the UPnP control unit 2720 sends the Hello message to the fourth UPnP control unit 4720 of the driver sending client 4000 that has been designated.

In the above-described example, the UPnP control unit 2720 sends the Hello message to the fourth UPnP control unit 4720 of "CLIENT00" and "CLIENT02", that are the driver sending clients 4000 (sending destination apparatuses).

In step S608, the fourth UPnP control unit 4720 of the driver sending client 4000 waits until the Hello message sent in step S607 is acquired. After acquiring the Hello message in step S608, the processing advances to step S609. In step S609, the fourth UPnP control unit 4720 sends the GetMetadata message (the device metadata) to the second UPnP control unit 2720.

In step S610, the second UPnP control unit 2720 of the device 2000 waits until the GetMetadata message sent in step S609 is acquired. After acquiring the GetMetadata message in step S610, the processing advances to step S611.

In step S611, the second UPnP control unit 2720 performs the following processing. That is, the second UPnP control unit 2720 generates a metadata message including the information about the device setting task that has been set based on the setting value for the device UPnP capacity flag in step S605.

In step S612, the second UPnP control unit 2720 sends the metadata message generated in step S611 to the fourth UPnP control unit 4720. In step S613, the fourth UPnP control unit 4720 of the driver sending client 4000 waits until the metadata message sent in step S612 is acquired.

After the metadata message is acquired in step S613, the processing advances to step S614. In step S614, the fourth UPnP control unit 4720 analyzes the acquired metadata message. More specifically, the fourth UPnP control unit 4720 acquires the connection destination information such as the IP address of the device 2000 and the location information about the driver or the driver itself according to the acquired metadata message.

In the above-described example, the fourth UPnP control unit 4720 acquires the IP address information of the device 2000 whose device number is "Dev-1", the location information about the driver whose driver ID is "DRIVER00", and the driver itself whose driver ID is "DRIVER00". In step S615, the fourth UPnP control unit 4720 installs the driver according to the result of the analysis in step S614.

The processing for installing the driver includes processing performed by the fourth UPnP control unit 4720 for prompting the user to perform the operation necessary to install the driver by issuing a request to the fourth display unit 4100 for installing the driver by displaying a GUI. Then, the processing in the flow charts of FIGS. 16A through 16D ends.

Furthermore, in the case where it is determined in step S600 that the parameter "Type-2" has been set as the setting value for the device UPnP capacity flag, the request for installing the driver includes the processing for displaying the location information about the driver on the GUI. On the other hand, in the case where it is determined in step S600 that the parameter "Type-3" has been set as the setting value for the device UPnP capacity flag, the request for installing the driver includes the processing for displaying the information indicating that the driver itself exists in the fourth storage unit 4400 of the driver sending client 4000 on the GUI. Then, the processing in the flow charts of FIGS. 16A through 16D ends.

As described above, in the present exemplary embodiment, when the device 2000 is connected to (enters) the network (the communication line 5000), the device 2000 sends the network entry message (the Hello message) to the management server 1000 by unicast according to the UPnP protocol.

The management server 1000 sends a reply to the network entry message, acquires the device metadata, and associates the device attribute information included in the device metadata with the driver corresponding to the device attribute information. In addition, the management server 1000 extracts the driver sending client 4000 that has been previously associated with the device attribute information included in the device metadata.

Then, the management server 1000 appropriately uses different methods for performing the processing (performs different processing operations) for installing the driver according to the capacity of the device 2000 and the management server 1000. More specifically, the management server 1000 generates a task according to the capacity for performing the UPnP unicast setting if it is determined that the device 2000 can perform the UPnP unicast setting.

The device 2000 instructs the driver sending client 4000 to perform the processing for installing the driver according to the task generated by and sent from the management server 1000. Furthermore, the management server 1000 utilizes the Pseudo UPnP processing to cause the driver sending client 4000 to perform the processing for installing the driver if it is determined in step S407 (FIG. 16B) that the pseudo UPnP processing can be performed.

As described above, according to the present exemplary embodiment, the management server 1000 can centrally manage the installed driver regardless of the capacity of the device 2000 to perform the UPnP unicast setting and the capacity of the management server 1000 to perform the pseudo UPnP processing.

In addition, according to the present exemplary embodiment, an appropriate driver can be installed in the driver sending client 4000 according to the capacity of the device 2000 and the capacity of the management server 1000 even if the driver sending client 4000 does not include a client agent. According to the present exemplary embodiment having the above-described configuration, the usability can be improved and the installed device driver can be easily and appropriately managed.

Furthermore, according to the present exemplary embodiment, the management costs can be effectively reduced. Furthermore, according to the present exemplary embodiment, the business operations can be performed with a high efficiency and thus the total cost of ownership (TCO) can also be effectively reduced.

In the present exemplary embodiment, whether the management server 1000 includes the pseudo UPnP function is determined if the remote UPnP unicast setting is not available (that is, the processing in step S407 is performed after the processing in step S401). However, the present invention is not limited to this.

That is, it is also useful if whether the remote UPnP unicast setting can be performed is determined in the case where the management server 1000 does not have the Pseudo UPnP function. To paraphrase this, it is also useful to perform the processing in step S401 after performing the processing in step S407.

Furthermore, in the present exemplary embodiment, both determinations are performed as to whether the remote UPnP unicast setting can be performed and whether the management server 1000 has the pseudo UPnP function. However, the present invention is not limited to this. That is, it is also useful if either one of the determinations as to whether the remote UPnP unicast setting can be performed and whether the management server 1000 has the pseudo UPnP function is performed.

Other Exemplary Embodiments

Each of the units that constitute the driver management apparatus and the client terminal apparatus and each step in the driver management method according to the exemplary embodiment of the present invention can be implemented by executing the program stored on a random access memory (RAM) or a read-only memory (ROM) of a computer. The program and a computer-readable recording medium (storage medium) storing the program are included in the present invention.

The present invention can be implemented in a system, an apparatus, a method, a program, or a storage medium storing the program, for example. More specifically, the present invention can be applied to a system including a plurality of devices and to an apparatus that includes one device.

The present invention can be implemented by directly or remotely supplying a program of software implementing functions of the above-described exemplary embodiments (in the exemplary embodiments, the program corresponding to the processing performed according to the flow charts in FIG. 4, FIG. 5, and FIGS. 16A through 16D) to a system or an apparatus and reading and executing the supplied program code with the system or a computer of the apparatus.

Accordingly, the program code itself, which is installed on the computer for implementing the functional processing of an exemplary embodiment of the present invention with the computer, implements the present invention. That is, the present invention also includes the computer program implementing the functional processing of an exemplary embodiment of the present invention.

Accordingly, the program can be configured in any form, such as object code, a program executed by an interpreter, and script data supplied to an OS.

As the recording medium for supplying such program code, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, and a digital versatile disk (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium such as a CD-ROM and the like which stores the program according to an exemplary embodiment of the present invention after an encryption thereof, by allowing the user who is qualified for a prescribed condition to download key information for decoding the encryption from the web site via the Internet, and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

According to an exemplary embodiment of the present invention, when a network entry message is sent by unicast from the device connected to the network according to the search protocol for one-to-one connection, the driver for operating the device is installed.

Accordingly, the present exemplary embodiment can manage the network entry message with a specific apparatus. Therefore, the present exemplary embodiment can manage the driver for performing a job output from the client terminal apparatus with a specific apparatus.

In addition, according to an exemplary embodiment of the present invention, different processing operations are used to install the driver according to at least one of the capacity of the device or the capacity of the driver management apparatus. Therefore, according to an exemplary embodiment of the present invention, the driver for performing a job can be appropriately installed according to the capacity of the device or the capacity of the driver management apparatus.

According to an exemplary embodiment of the present invention having the above-described configuration, the driver for performing a job can be appropriately managed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-298273 filed Nov. 16, 2007, which is hereby incorporated by reference herein in its entirety.

What is claimed is:

1. A driver management apparatus comprising at least a processor, functioning as:
   a receiving unit configured to receive a network entry message sent by unicast according to a search protocol for one-to-one connection from one of a plurality of devices connected to a network;
   a determination unit configured to determine a capacity to install a driver according to the search protocol for one-to-one connection of a device connected to the network,
   wherein the capacity to install the driver includes a capacity to perform an information communication with a client terminal apparatus connected to the network by unicast according to the search protocol for one-to-one connection based on an external setting; and
   a processing unit configured to perform processing for installing, on a client terminal apparatus connected to the network, a driver for operating the device that has sent the network entry message,
   wherein the processing unit is configured to perform different processing operations for installing the driver for operating the device with respect to respective devices having different capacities according to the capacity determined by the determination unit, and
   wherein, if it is determined by the determination unit that the driver management apparatus has the capacity to install the driver by plug-and-play according to the search protocol for one-to-one connection, the processing unit is configured to perform a communication with the client terminal apparatus connected to the network by unicast according to the search protocol for one-to-one connection and to install the driver on the client terminal apparatus.

2. The driver management apparatus according to claim 1, further comprising a second determination unit configured, if it is determined by the determination unit that the device has a capacity, to determine a level of the capacity,
   wherein the processing unit is configured to generate a different task as a task for installing the driver according to the level of the capacity determined by the second determination unit and to send the task to the device.

3. The driver management apparatus according to claim 2, wherein the second determination unit is configured to determine whether a first capacity to set information related to a location of a client terminal apparatus on which the driver is to be installed, a second capacity to set the information related to the location of the client terminal apparatus on which the driver is to be installed and information related to a location of the driver to be installed, or a third capacity to set the information related to the location of the client terminal apparatus on which the driver is to be installed and to upload the driver is included in the device.

4. The driver management apparatus according to claim 1, further comprising:
   a second receiving unit configured to receive, from the device that has sent the network entry message, device attribute information indicating an attribute of the device; and
   a registration unit configured to previously store device attribute information indicating an attribute of a device and information about a client terminal apparatus in association with each other on a storage medium,
   wherein the processing unit is configured to perform processing for installing the driver on the client terminal apparatus registered by the registration unit in association with the device attribute information received by the second receiving unit.

5. The driver management apparatus according to claim 4, further comprising an association unit configured to associate the device that has sent the network entry message with a driver corresponding to device attribute information indicating an attribute of the device.

6. A method for managing a device driver, the method comprising:

receiving a network entry message sent by unicast according to a search protocol for one-to-one connection from one of a plurality of devices connected to a network;

determining a capacity to install a driver according to the search protocol for one-to-one connection of a device connected to the network, wherein the capacity to install the driver includes a capacity to perform an information communication with a client terminal apparatus connected to the network by unicast according to the search protocol for one-to-one connection based on an external setting;

performing processing for installing, on a client terminal apparatus connected to the network, a driver for operating the device that has sent the network entry message;

performing different processing operations for installing the driver for operating the device with respect to respective devices having different capacities according to the determined capacity; and if it is determined that the driver management apparatus has the capacity to install the driver by plug-and-play according to the search protocol for one-to-one connection, performing a communication with the client terminal apparatus connected to the network by unicast according to the search protocol for one-to-one connection, and installing the driver on the client terminal apparatus.

7. The method according to claim 6, further comprising:
if it is determined that the device has a capacity, determining a level of the capacity; and
generating a different task as a task for installing the driver according to the determined level of the capacity and sending the task to the device.

8. The method according to claim 7, further comprising determining whether a first capacity to set information related to a location of a client terminal apparatus on which the driver is to be installed, a second capacity to set the information related to the location of the client terminal apparatus on which the driver is to be installed and information related to a location of the driver to be installed, or a third capacity to set the information related to the location of the client terminal apparatus on which the driver is to be installed and to upload the driver is included in the device.

9. The method according to claim 6, further comprising:
previously storing device attribute information indicating an attribute of a device and information about a client terminal apparatus in association with each other on a storage medium; and
when receiving, from the device that has sent the network entry message, device attribute information indicating an attribute of the device, performing processing for installing the driver on the client terminal apparatus registered in association with the received device attribute information.

10. The method according to claim 9, further comprising associating the device that has sent the network entry message with a driver corresponding to device attribute information indicating an attribute of the device.

11. A computer-readable storage medium storing instructions which, when executed by an apparatus, cause the apparatus to perform operations comprising:
receiving a network entry message sent by unicast according to a search protocol for one-to-one connection from one of a plurality of devices connected to a network;
determining a capacity to install a driver according to the search protocol for one-to-one connection of a device connected to the network, wherein the capacity to install the driver includes a capacity to perform an information communication with a client terminal apparatus connected to the network by unicast according to the search protocol for one-to-one connection based on an external setting;
performing processing for installing, on a client terminal apparatus connected to the network, a driver for operating the device that has sent the network entry message;
performing different processing operations for installing the driver for operating the device with respect to respective devices having different capacities according to the determined capacity; and
if it is determined that the driver management apparatus has the capacity to install the driver by plug-and-play according to the search protocol for one-to-one connection, performing a communication with the client terminal apparatus connected to the network by unicast according to the search protocol for one-to-one connection, and installing the driver on the client terminal apparatus.

* * * * *